US012579325B2

(12) United States Patent
Vogel

(10) Patent No.: US 12,579,325 B2
(45) Date of Patent: Mar. 17, 2026

(54) EFFICIENT AND SECURE DATA HANDLING USING DOMAIN-ORIENTED MASKING

(71) Applicant: Google LLC, Mountain View, CA (US)

(72) Inventor: Pirmin Robert Vogel, Zürich (CH)

(73) Assignee: Google LLC, Mountain View, CA (US)

( * ) Notice: Subject to any disclaimer, the term of this patent is extended or adjusted under 35 U.S.C. 154(b) by 188 days.

(21) Appl. No.: 18/714,513

(22) PCT Filed: Dec. 16, 2022

(86) PCT No.: PCT/US2022/081844
§ 371 (c)(1),
(2) Date: May 29, 2024

(87) PCT Pub. No.: WO2023/115022
PCT Pub. Date: Jun. 22, 2023

(65) Prior Publication Data
US 2025/0036816 A1 Jan. 30, 2025

Related U.S. Application Data

(60) Provisional application No. 63/265,673, filed on Dec. 17, 2021.

(51) Int. Cl.
*H04L 9/06* (2006.01)
*G06F 21/72* (2013.01)
*H04L 9/00* (2022.01)

(52) U.S. Cl.
CPC .............. *G06F 21/72* (2013.01); *H04L 9/003* (2013.01); *H04L 9/0631* (2013.01); *H04L 2209/04* (2013.01); *H04L 2209/125* (2013.01)

(58) Field of Classification Search
CPC .. G06F 21/72; G09C 1/02; G09C 1/00; H04L 9/003; H04L 9/002; H04L 2209/04; H04L 2209/125; H04L 9/0631
See application file for complete search history.

(56) References Cited

U.S. PATENT DOCUMENTS 5,878,058 A * 3/1999 Im ..................... H03M 13/6502
714/752
8,155,308 B1 * 4/2012 Poo ....................... H04L 9/0637
380/37
(Continued)

FOREIGN PATENT DOCUMENTS

JP          2013072950 A      4/2013
WO          2008146482 A1    12/2008
(Continued)

OTHER PUBLICATIONS

Oshida, Hirokazu, et al. "On masked galois-field multiplication for authenticated encryption resistant to side channel analysis." International Workshop on Constructive Side-Channel Analysis and Secure Design. Cham: Springer International Publishing, 2018.*
(Continued)

*Primary Examiner* — David Garcia Cervetti
(74) *Attorney, Agent, or Firm* — Colby Nipper PLLC

(57) ABSTRACT

This document discloses techniques, apparatuses, and systems for efficient and secure data handling using domain-oriented masking. In aspects, efficient and secure data handling using domain-oriented masking enables circuit resources (e.g., flip flops, data) to be shared between portions of an integrated circuit (IC). Specifically, an input register of a Galois-Field (GF) multiplier and a pipeline register within a stage of an Advanced Encryption Standard Substitution-Box (S-Box) may be implemented as sharing a single flip flop. Some ICs may utilize multiple S-Boxes, including multiple GF multipliers that are provided randomness each time the input is updated. In this case, an output from a previous stage of a first S-box may be provided as randomness to a subsequent stage of a second S-Box to limit the need for entropy generation circuitry. In this way, efficient and secure data handling using domain-oriented
(Continued)

masking may decrease circuit cost and circuit area without impacting security.

20 Claims, 9 Drawing Sheets

(56) References Cited

U.S. PATENT DOCUMENTS

| | | | | |
|---|---|---|---|---|
| 8,750,498 | B1 | 6/2014 | Poo et al. | |
| 9,934,841 | B1 * | 4/2018 | Langhammer | G06F 11/1048 |
| 10,110,376 | B1 * | 10/2018 | Little | H04L 9/12 |
| 10,116,334 | B1 * | 10/2018 | Wang | H03M 13/6502 |
| 2003/0105791 | A1 * | 6/2003 | Stein | H03M 13/158 |
| | | | | 708/492 |
| 2003/0135530 | A1 * | 7/2003 | Parthasarathy | G06F 7/724 |
| | | | | 708/492 |
| 2005/0058285 | A1 * | 3/2005 | Stein | H04L 9/0631 |
| | | | | 380/37 |
| 2005/0283714 | A1 * | 12/2005 | Korkishko | G06F 7/724 |
| | | | | 714/781 |
| 2006/0120527 | A1 * | 6/2006 | Baek | G06F 7/726 |
| | | | | 380/252 |
| 2006/0256963 | A1 * | 11/2006 | Gebotys | H04L 9/0618 |
| | | | | 380/205 |
| 2009/0279688 | A1 * | 11/2009 | Michaels | H04L 9/0668 |
| | | | | 380/28 |
| 2010/0086126 | A1 | 4/2010 | Yokota et al. | |
| 2011/0013769 | A1 | 1/2011 | Itoh et al. | |
| 2013/0077790 | A1 | 3/2013 | Kawabata | |
| 2014/0208079 | A1 * | 7/2014 | Bradbury | G06F 9/30036 |
| | | | | 712/222 |
| 2015/0100796 | A1 * | 4/2015 | Gueron | G06F 9/30047 |
| | | | | 713/193 |
| 2020/0195275 | A1 * | 6/2020 | Chow | H03M 13/158 |
| 2021/0399876 | A1 * | 12/2021 | Ghosh | H04L 9/0631 |
| 2022/0278822 | A1 * | 9/2022 | Ekdahl | H04L 9/0631 |
| 2022/0414268 | A1 * | 12/2022 | Landry | G06F 21/72 |
| 2023/0134515 | A1 * | 5/2023 | Mukai | H04L 9/0894 |
| 2024/0028341 | A1 * | 1/2024 | Ozturk | G06F 9/30036 |
| 2024/0045998 | A1 * | 2/2024 | Hutter | G06F 21/755 |
| 2025/0036818 | A1 * | 1/2025 | Hutter | G06F 9/30029 |
| 2025/0112759 | A1 * | 4/2025 | Kumar | H04L 9/0631 |

FOREIGN PATENT DOCUMENTS

| | | |
|---|---|---|
| WO | 2009122464 A1 | 10/2009 |
| WO | 2023115022 | 6/2023 |

OTHER PUBLICATIONS

Zhang, Qian, et al. "A Compact AES Hardware Implementation Secure Against 1st-Order Side-Channel Attacks." 2018 IEEE 36th International Conference on Computer Design (ICCD). IEEE, 2018.*

Groß, Hannes, Stefan Mangard, and Thomas Korak. "An efficient side-channel protected AES implementation with arbitrary protection order." Cryptographers' Track at the RSA Conference. Cham: Springer International Publishing, 2017.*

Ueno, Rei, et al. "Automatic generation of formally-proven tamper-resistant Galois-field multipliers based on generalized masking scheme." Design, Automation & Test in Europe Conference & Exhibition (DATE), 2017. IEEE, 2017.*

Groß, Hannes, Rinat Iusupov, and Roderick Bloem. "Generic low-latency masking in hardware." IACR transactions on cryptographic hardware and embedded systems (2018): 1-21.*

"International Search Report and Written Opinion", Application No. PCT/US2022/081844, Mar. 18, 2024, 17 pages.

"Invitation to Pay Additional Fees and Partial Search Report", Application No. PCT/US2022/081844, Jan. 24, 2024, 11 pages.

Covic, et al., "Circuit Masking: From Theory to Standardization A Comprehensive Survey for Hardware Security Researchers and Practitioners", Jun. 30, 2021, 41 pages.

Gross, et al., "An Efficient Side-Channel Protected AES Implementation with Arbitrary Protection Order", Jan. 10, 2027.

Gross, Hannes, "Domain-Oriented Masking: Compact Masked Hardware Implementations with Arbitrary Protection Order", Oct. 2016, 24 pages.

Shahmirzadi, et al., "New First-Order Secure AES Performance Records", Feb. 15, 2021, 25 pages.

"Foreign Office Action", JP Application No. 2024-535870, Jul. 22, 2025, 5 pages.

"International Preliminary Report on Patentability", Application No. PCT/US2022/081844, Jun. 13, 2024, 12 pages.

* cited by examiner

700 —

Evaluate a first GF multiplier of a first S-Box
702

Transmit an intermediate result of the first GF multiplier
to a second GF multiplier of a second S-Box
704

Receive the intermediate result of the first GF multiplier
706

Evaluate the second GF multiplier using the intermediate result
of the first GF multiplier as fresh randomness for remasking
708

EFFICIENT AND SECURE DATA HANDLING USING DOMAIN-ORIENTED MASKING

RELATED APPLICATION(S)

This application is a national stage entry of International Application No. PCT/US2022/081844, filed Dec. 16, 2022, which claims the benefit of U.S. Provisional Application No. 63/265,673, filed Dec. 17, 2021, the disclosures of which are incorporated herein by reference in their entirety.

BACKGROUND

Electronic devices often include at least one integrated circuit (IC) that enables various functionalities. To perform some of these functionalities securely, an electronic device may store or operate with secret information that is restricted to certain access levels within the IC. An attacker may attempt to gain unauthorized access to this secret information to compromise or alter the operations of the IC. Existing approaches to prevent unauthorized access of ICs, however, are often expensive and spatially challenging.

SUMMARY

This document discloses techniques, apparatuses, and systems for efficient and secure data handling using domain-oriented masking. In aspects, efficient and secure data handling using domain-oriented masking enables circuit resources (e.g., flip flops, data) to be shared between different portions of an integrated circuit (IC). Specifically, an input register of a Galois-field (GF) multiplier and a pipeline register within a stage of an Advanced Encryption Standard (AES) Substitution-Box (S-Box) may be implemented as sharing a single flip flop. The term "Advanced Encryption Standard (AES)" refers to a specification for the encryption of electronic data established by the U.S. National Institute of Standards and Technology (NIST) in 2001. Some ICs may utilize multiple S-Boxes, including multiple GF multipliers that are provided randomness each time the input is updated. In this case, an output from a previous stage of a first S-box may be provided as randomness to a subsequent stage of a second S-Box to limit the need for entropy generation circuitry. In this way, efficient and secure data handling using domain-oriented masking may decrease circuit cost and circuit area without impacting security.

An IC is described that includes an AES S-Box. The AES S-Box includes a first stage, including a masked GF multiplier, at least two input registers to the masked GF multiplier, and at least two pipeline registers from the first stage to a second stage of the AES S-Box. A first flip flop is implemented that is configured to operate on a first pair of registers, including a first input register of the at least two input registers to the masked GF multiplier and a first pipeline register of the at least two pipeline registers from the first stage to the second stage. A second flip flop is also implemented that is configured to operate on a second pair of registers including a second input register of the at least two input registers and a second pipeline register of the at least two pipeline registers.

Another IC is described that includes at least two AES S-Boxes. A first AES S-Box includes a previous stage, including a first GF multiplier, where an output of a first GF multiplier is coupled to a randomness input of a second GF multiplier within a subsequent stage of an additional advanced AES S-Box of the at least two AES S-Boxes.

A method for performing cryptographic operations using one or more of the disclosed ICs is also described.

This Summary is provided to introduce simplified concepts for implementing efficient and secure data handling using domain-oriented masking. The simplified concepts are further described below in the Detailed Description. This Summary is not intended to identify essential features of the claimed subject matter, nor is it intended for use in determining the scope of the claimed subject matter.

BRIEF DESCRIPTION OF THE DRAWINGS

The details of one or more aspects of the described systems and methods for efficient and secure data handling using domain-oriented masking are described below. The use of the same reference numbers in different instances in the description and the figures indicate similar elements.

FIG. TA illustrates a first-order masked multiplier and a first-order domain-oriented mask multiplier.

DETAILED DESCRIPTION

Figure 1A:
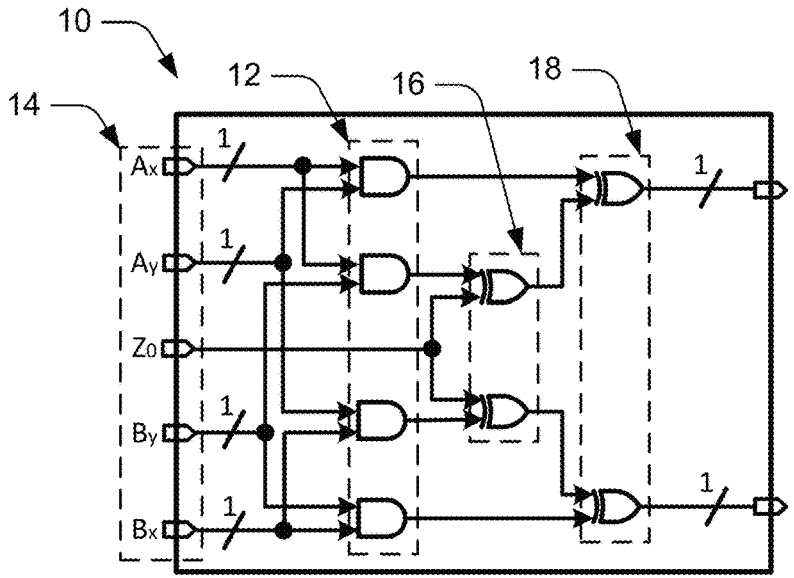
FIG. 1B illustrates an example operating environment that includes electronic devices that may implement efficient and secure data handling using domain-oriented masking.

In general, there are a variety of methods that attackers may use to retrieve privileged information about the cryptographic process of an IC. For example, side-channel analysis (SCA) may be used to extract secret assets (e.g., keys) by measuring, for example, power consumption, electromagnetic emanation, padding operation, or timing behavior of an IC in operation. In some cases, SCA can be effective because these channels (e.g., the power consumption, electromagnetic emanation, padding operation, or timing behavior of an IC) depend on the intermediate values being created and/or processed by the IC.

To mitigate SCA, Boolean masking can be implemented to make these channels independent of the true values produced and/or processed by the integrated circuit. In aspects, Boolean masking is performed by randomizing the intermediate values produced in the execution of the circuit. In this way, the channels, while still data dependent, may be indicative of the randomized data instead of the actual true intermediate values, and the attacker may be unable to determine any useful information from SCA. In one example, Boolean masking may be performed over a function. Specifically, a function may be replicated to produce two copies of the function in parallel, where each copy of the function operates on either the mask or the masked data. In other implementations, the two operations may be run on a single instance of the function by separating the operations by time.

In either implementation, a masking value (e.g., the mask) may be added to the input value and processed in one execution of the function. The mask alone may also be processed in another execution of the function. After the function has returned values for both operations, the output of the function (e.g., from the mask and the masked data) may be combined (e.g., summed) to create the true output. This summing process produces the true output of the function when provided with the input value because, in Galois/finite-field arithmetic, which is commonly used in crypto blocks, the additive inverse of two elements is the element itself. For example, a plus operation can be thought of as a minus operation such that an element summed with itself is zero. However, this process only works when the function used to process the data is a linear operation.

When the function is a non-linear operation special handling may be required to implement Boolean masking. Specifically, the input value and the mask may need to be mixed, as the mask and the input may no longer be able to be processed individually. From an SCA perspective, processing the mixed data may present design difficulties and fresh randomness may be needed to perform remasking. In a simple non-linear masking implementation, a masked AND gate is used to compute Aq and Bq from Ax, Ay, Bx, and By. Specifically, A may represent the masked data and B may represent the mask. (As noted below with respect to FIG. 4 the subscript "x" refers an input and the subscript "y" indicates an output. The subscript q denotes mixed data.) In aspects, this implementation may be described arithmetically as $Aq+Bq=(Ax+Bx)*(Ay+By)$. In FIG. TA, a first-order masked multiplier 10 is illustrated. In this simple implementation, four AND gates 12 are used as multipliers on the inputs 14. Fresh randomness (Z0) is added (e.g., via XOR gates 16) to an intermediate result in the resharing step before integrating the results back together using the final two XOR gates 18. Because the power consumption still depends on the output value (e.g., Aq+Bq) or the data being processed (e.g., Ax, Ay), certain events within operation of the circuit may allow an individual to determine information about the IC through SCA.

For example, glitches may occur (e.g., at Bx) in an IC where a voltage drops from a high to a low value (e.g., a bit flips) and back due to the transient effects of signals. Glitches may occur commonly in digital circuits, as many implementations only define the signal to be stable at the end of the clock cycle. As a result, intermediate changes (e.g., glitches) may occur within each cycle. Often, these glitches may result in a power signature that is dependent on the true value of the data. For example, a glitch may occur at Bx (e.g., Bx drops from a one to a zero and then back to one). As a result of the glitch, the number of gates that switch depends on the value of the other inputs, as shown in Table 1 below with respect to different input values.

TABLE 1

| Example of Glitch Effects on Logic Gates | | | | | |
|---|---|---|---|---|---|
| y | Ay | By | AND | XOR | Total |
| 0 | 0 | 0 | 0 | 0 | 0 |
| 1 | 0 | 1 | 1 | 1 | 2 |
| 1 | 1 | 0 | 1 | 2 | 3 |
| 0 | 1 | 1 | 2 | 2 | 4 |

From the Table 1, it can be seen that the number of total gates flipped depends uniquely on the value of y such that the value of y or the values of Ay and By may be determined from the number of gates flipped, which in turn affects the power signature.

To minimize the effect of glitches on the power signature, flip flops and/or registers may be inserted within the function to control the transient effects of the signals. In FIG. TA, a first-order domain-oriented masked multiplier 20 is illustrated. As illustrated, flip flops and/or registers 22 may be added at the output of an AND gate that receives as input Ax and Ay and at the output of an AND gate that receives as input Bx and By. Flip flops and/or registers 22 may also be added at the output of intermediate XOR gates (e.g., XOR gates 16). As a result, fresh randomness (Z0) is added to the results of the AND gates. Further, by positioning these flip flops and/or registers 22 at particular locations in the circuit, the circuit is transformed from a masked circuit to a domain-oriented masked circuit (e.g., first-order domain-oriented masked multiplier 20). By analyzing the effect of glitches after a flip flop and/or register 22 has been placed in the circuit, it can be seen that the glitches no longer affect the power signature such that it is dependent on the true values of the data.

In modem circuits, however, logic synthesis tools may attempt to optimize the design of a circuit to require the least amount of circuit area, operations, or power. In this way, a synthesis tool may optimize away integral portions of a circuit that are used for protecting against SCA. For example, a synthesis tool may shift the flip flops to be executed after the intermediate values have been integrated together, thereby allowing flip flops from different copies of the function to be shared and reducing the required flip flops from four to two. While this optimization may produce the correct value, it may also cause side-channel leakage that, in the event of glitches, creates a power signature or other channel signature dependent on the true values. To eliminate the ability for synthesis tools to optimize away SCA protections, circuit optimizations automatically performed during synthesis (e.g., circuit synthesis tools) may need to be disabled.

By disabling circuit synthesis tools to resist security softening, a circuit may be unable to perform valuable optimizations that decrease circuit area and lower circuit cost. To this end, it may be valuable to determine cryptographically secure circuit optimizations that may be implemented in circuit designs to save cost and space without increasing the risk of a successful cryptographic attack. In aspects, the techniques, apparatuses, and systems for efficient and secure data handling using domain-oriented masking enable circuit resources to be shared in a cryptographically-safe manner.

To enable the cryptographic functions described above, many ICs include cryptographic modules or cryptographic ICs. Some ICs may implement an Advanced Encryption Standard (AES) unit that relies on randomness to implement security functions through secure circuitry. One example of this secure circuitry is a Substitution-Box (S-Box). An S-Box can be used to encrypt/decrypt data or keys used in cryptographic operations. S-Boxes may utilize domain-oriented masking because they operate on sensitive information that, if released to an attacker, for example, through SCA, could compromise the IC. As such, S-Boxes may be improved through cryptographically-safe optimizations.

S-Boxes consist of a number of stages that include Galois-field (GF) multipliers. Each GF multiplier may receive multiple inputs (e.g., the mask and the masked data) from input registers that are located upstream. These input registers may be used to control the release of data to the GF multipliers. Similarly, each stage may include one or more pipeline registers that provide data from a previous stage to a subsequent stage. In some S-Box designs, each of the input register and the pipeline registers may be coupled to a separate flip flop that controls the occurrence of glitches within the signal. The techniques, apparatuses, and systems for efficient and secure data handling using domain-oriented masking, however, may utilize a shared flip flop to control the occurrence of glitches in data released from the registers because the values held in the input register and the corresponding pipeline register may be the same. In this way, a single flip flop may be removed from the S-Box design for each pair of an input register and a pipeline register, thereby decreasing circuit area and reducing circuit cost.

While optimizations internal to each S-Box are discussed above, the techniques may extend to optimizations between multiple S-Boxes. In general, many AES units include multiple S-Boxes to enable more complex operations to be completed in less time. During execution, a GF multiplier of each S-Box may be required to be provided fresh randomness (or pseudo-randomness) whenever the input of the multiplier is updated. If this requirement is not followed, the operation of the AES unit may become deterministic, and side-channel leakage may occur. To abide by this requirement, S-boxes typically include randomness generation circuits and buffer logic that precisely provide entropy to each multiplier, which, in many cases, requires large and costly circuitry.

In contrast to these methods, efficient and secure data handling using domain-oriented masking may utilize an output from a previous stage of a first S-Box as randomness in a subsequent stage of a second S-Box. For example, multiple S-Boxes may be communicatively coupled such that data indicative of the mask output or masked data output from a first S-Box may be connected to a randomness input of a second S-Box. By linking an output of a previous stage to an input of a subsequent stage, randomness may only be provided by the previous stage when the inputs to the multiplier are updated in the subsequent stage, as may be required for cryptographically-safe operation. In doing so, costly randomness generation/distribution circuits may be removed from the S-Box without affecting cryptographic guarantees.

It should be noted that these are but a few examples of efficient and secure data handling using domain-oriented masking described in this document, and other examples will be described below. This disclosure will now turn to a description of an example operating environment, followed by examples of secure circuitry, including an AES unit and one or more S-Box thereof, various techniques for utilizing efficient and secure data handling using domain-oriented masking, and an example electronic device capable of implementing efficient and secure data handling using domain-oriented masking.

Figure 1A:
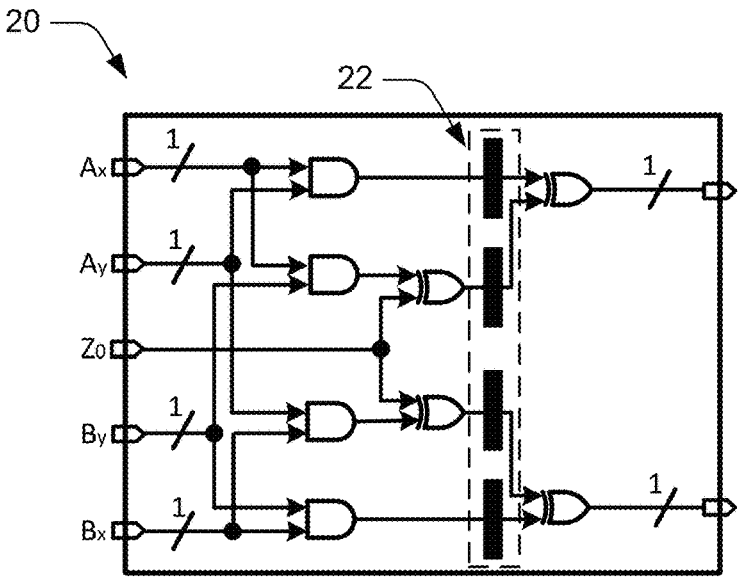
Figure 1B:
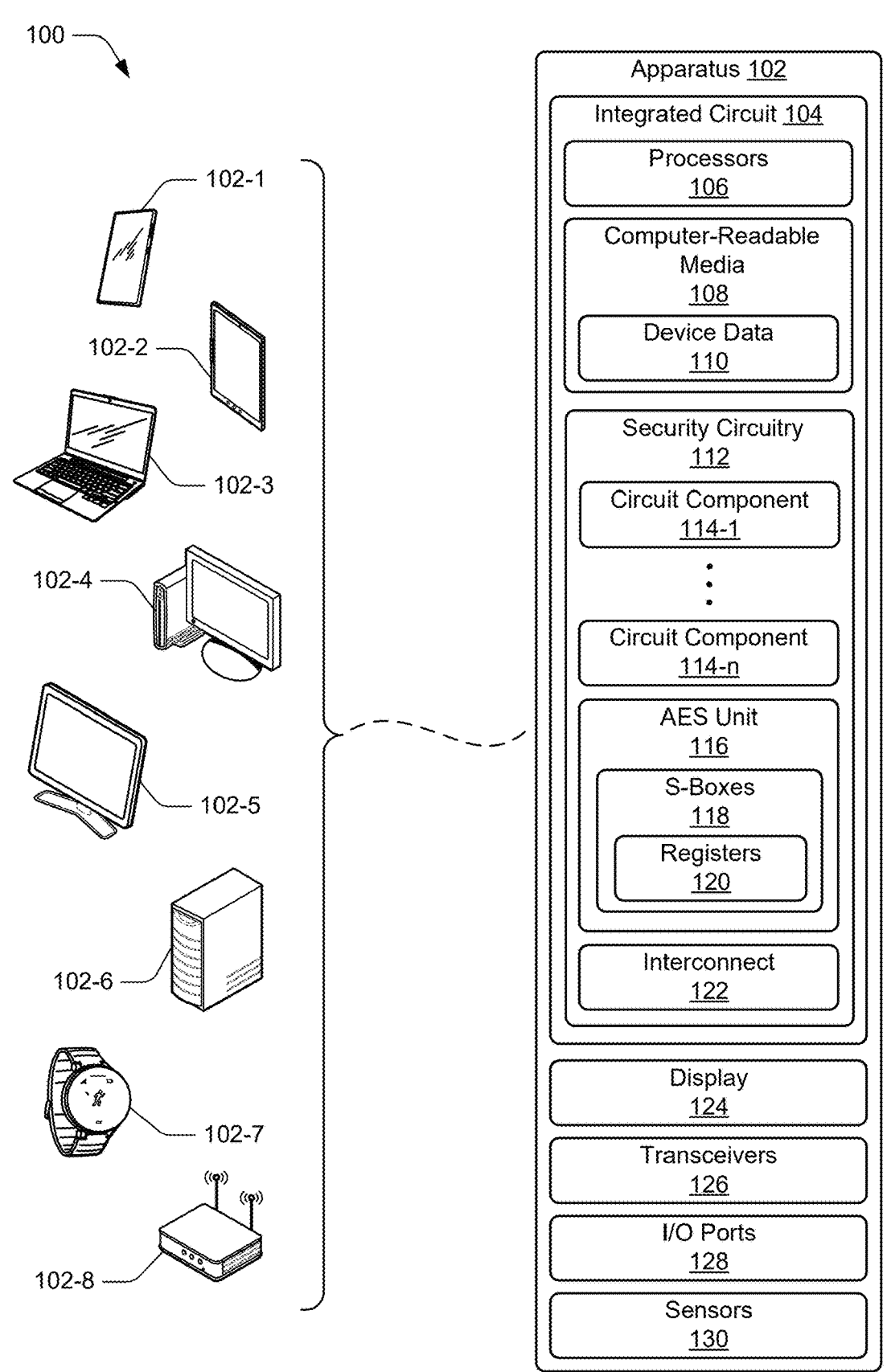

FIG. 1B illustrates an example environment 100 that includes an apparatus 102 in which aspects of efficient and secure data handling using domain-oriented masking can be implemented. The apparatus 102 may be implemented as any suitable device (e.g., electronic device), some of which are illustrated as a smart-phone 102-1, a tablet computer 102-2, a laptop computer 102-3, a gaming console 102-4, a desktop computer 102-5, a server computer 102-6, a wearable computing device 102-7 (e.g., smart-watch), and a broadband router 102-8 (e.g., mobile hotspot). Although not shown, the apparatus 102 may also be implemented as any of a mobile station (e.g., fixed- or mobile-STA), a mobile communication device, a client device, a user equipment, a mobile phone, an entertainment device, a mobile gaming console, a personal media device, a media playback device, a health monitoring device, a drone, a camera, an Internet home appliance capable of wireless Internet access and browsing, an IoT device, and/or other types of electronic devices. The apparatus 102 may provide other functions or include components or interfaces omitted from FIG. 1B for the sake of clarity or visual brevity.

The apparatus 102 includes an IC 104 that utilizes one or more processors 106 and computer-readable media (CRM 108), which may include memory media or storage media. The processors 106 may be implemented as a general-purpose processor (e.g., of a multicore central processing unit (CPU) or application processor (AP)), an application-specific integrated circuit (ASIC), graphics processing unit (GPU), or a System-on-Chip (SoC) with other components of the apparatus 102 integrated therein. The CRM 108 can include any suitable type of memory media or storage media, such as read-only memory (ROM), programmable ROM (PROM), random access memory (RAM), dynamic RAM (DRAM), static RAM (SRAM), or Flash memory. In the context of this discussion, the computer-readable media 108 of the apparatus 102 is implemented as at least one hardware-based or physical storage device, which does not include transitory signals or carrier waves. Applications, firmware, and/or an operating system (not shown) of the apparatus 102 can be embodied on the computer-readable media 108 as processor-executable instructions, which may be executed by the processor 106 to provide various functionalities described herein. The computer-readable media 108 may also store device data 110, such as user data or user media that is accessible through the applications, firmware, or operating system of the apparatus 102.

In this example, the IC 104 contains security circuitry 112. The apparatus 102, the IC 104, or the security circuitry 112 may implement a secure cryptographic processor. The security circuitry 112 may be implemented using one or more circuit components 114, for example, circuit component 114-1 through circuit component 114-n. The circuit components 114 may be organized to perform any number of operations to enable functionality of the apparatus 102. Examples of circuit components include a processor and multiple functional components as described in FIG. 2. The security circuitry 112 can be realized as, for example, a protected enclave, a trusted chip platform, a hardware-based root of trust (RoT) chip (e.g., a silicon RoT), and so forth. Regardless of how or where the security circuitry 112 is incorporated into an electronic device, the security circuitry 112 may counter many different types of attacks.

The security circuitry 112 may include one or more AES unit 116 that may perform cryptographic operations of the IC 104. In aspects, the AES unit 116 may implement one or more S-Boxes 118 that include one or more registers 120. The S-Boxes 118 may be used to perform cryptographic operations, e.g., an operation of encrypting data or decrypting data. As non-limiting examples, the data may be image data (e.g. captured by a camera or video camera) or sound data (e.g. captured by a microphone). In one example, the S-Boxes 118 may be used to generate a private/public key pair. The public key is transmitted out of the apparatus 102 via the transceivers 126 and/or the I/O ports 128. The private key may be used to decrypt data (e.g. image/sound data) received by the apparatus 102 via the transceivers 126 and/or the I/O ports 128, and which are encrypted using the public key. Alternatively or additionally, data, such as image or sound data, may be hashed using the private key to generate a hash digest, and the data and the hash digest may be transmitted out of the apparatus 102, via the transceivers 126 and/or the I/O ports 128, such that the hash digest functions as a signature for the data, which a third party can verify using the public key.

In another example, the AES unit 116 may perform Boolean masking and remasking operations on data operated on by the IC 104. The AES unit 116 may handle device secrets that are used to ensure the appropriate usage and performance of the IC 104, for example, cryptographic keys or other privileged information. To protect the privileged information handled by the AES unit 116, cryptographically secure operations may be performed to protect against various attacks that may release device secrets or information about the IC 104. Example operations of the AES unit 116 are described in more detail with respect to FIG. 3.

The S-Boxes 118 or the AES unit 116 may be implemented in accordance with one or more aspects of efficient and secure data handling using domain-oriented masking. The techniques may utilize cryptographically safe optimizations to reduce circuit cost and circuit area without creating security vulnerabilities. One or more aspects of efficient and secure data handling using domain-oriented masking will be described in greater detail with respect to FIGS. 4 through 6.

As shown, the security circuitry 112 is coupled to an interconnect 122. The interconnect 122 can be realized using, for example, a bus, a switching fabric, or a bus network that enables the various circuit components to communicate. Each of the circuit elements may be directly or indirectly coupled to the interconnect 122.

The apparatus 102 may also include a display 124, transceivers 126, input/output ports (e.g., I/O ports 128) and/or sensors 130. The display 124 may be operably coupled with one of the processors 106 (e.g., graphics processing unit (GPU)) and configured to graphically present an operating system or applications of the apparatus 102. The transceivers 126 may be configured to enable wired or wireless communication of data (e.g., device data 110) over wired or wireless networks according to any suitable communication protocol. The I/O ports 128 of the apparatus 102 may include universal serial bus (USB) ports, coaxial cable ports, and other serial or parallel connectors (including internal connectors) useful to couple the apparatus 102 to various components, peripherals, or accessories such as keyboards, microphones, or cameras.

The apparatus 102 also includes sensors 130, which enable the apparatus 102 to sense various properties, variances, stimuli, or characteristics of an environment in which the apparatus 102 operates. For example, the sensors 130 may include various motion sensors, ambient light sensors, acoustic sensors, capacitive sensors, infrared sensors, temperature sensors, radar sensors, or magnetic sensors. In aspects, the sensors 130 may be used to generate entropy for the S-Boxes 118 or the AES unit 116, generally. Alternatively or additionally, the sensors 130 may enable interaction with, or receive input from, a user of apparatus 102, such as through touch sensing or proximity sensing.

Figure 2:
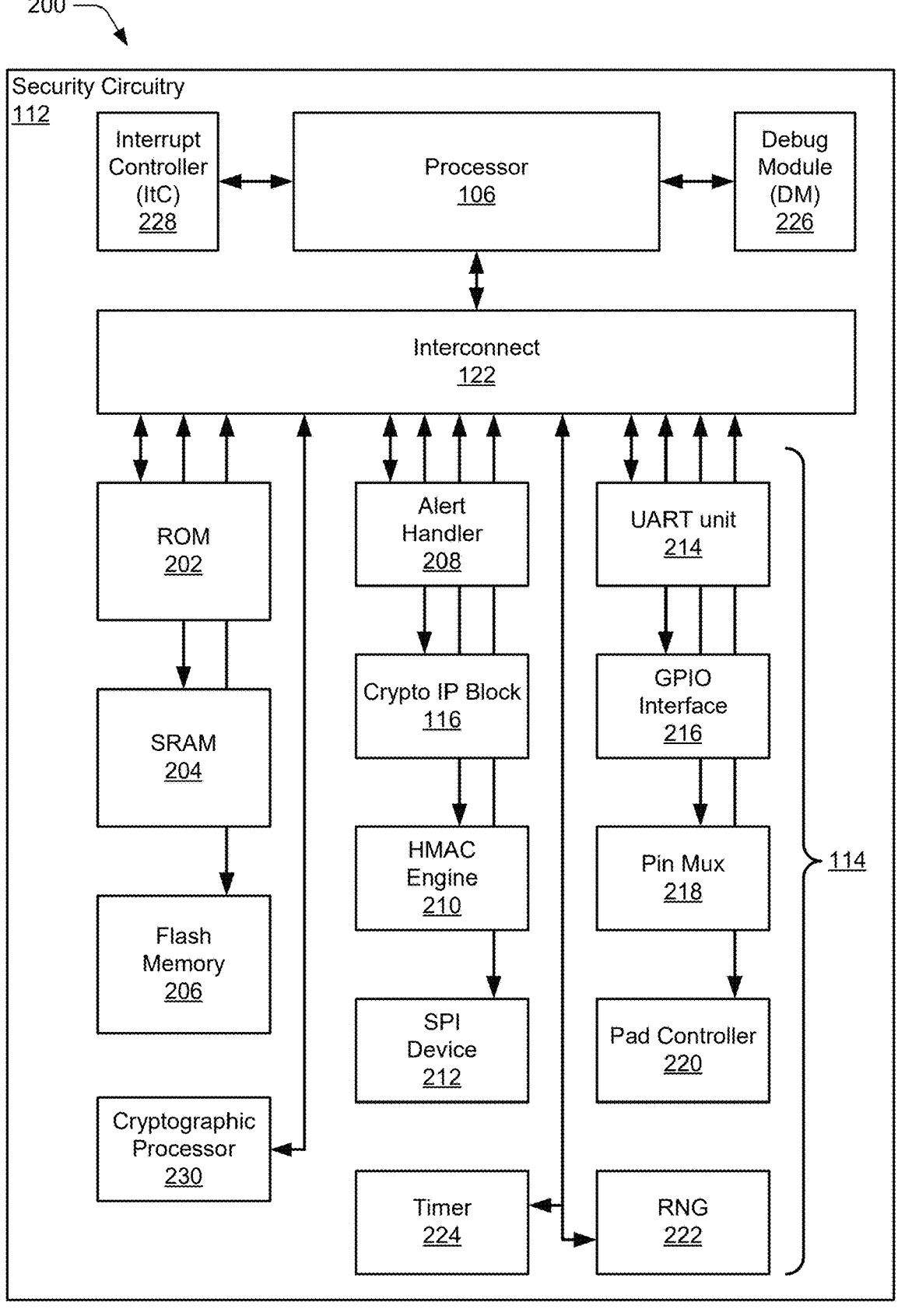
FIG. 2 illustrates an example implementation of example security circuitry which includes multiple circuit components that can be implemented to support aspects of efficient and secure data handling using domain-oriented masking.

FIG. 2 illustrates an example implementation 200 of example security circuitry 112 which includes multiple circuit components, including multiple example circuit components 114, that can be implemented to support aspects of efficient and secure data handling using domain-oriented masking. As shown, the security circuitry 112 includes a processor 106 that is coupled to an interconnect 122. Each of the processor 106, the multiple memories, and the multiple other circuit components 114 may be directly or indirectly coupled to the interconnect 122. In aspects, the components of FIG. 2 may be embodied as a secure computing platform or a secure SoC that implements an RoT and/or other secure cryptographic features.

In example implementations, the multiple memories can include a read-only memory (ROM 202), a static random-access memory (SRAM 204), and a flash memory 206. In aspects, the ROM 202, SRAM 204, or the—flash memory 206 may be implemented within the security circuitry 112 or within the CRM (e.g., CRM 108). The multiple circuit components 114 can include an alert handler 208, an AES unit 116, a hash-based message authentication code (HMAC) engine (HMAC engine 210), and a serial peripheral interface (SPI) device (SPI device 212). The multiple circuit components 114 can also include a universal asynchronous receiver/transmitter (UART) unit (UART unit 214), a general-purpose input/output (GPIO) interface (GPIO interface 216), a pin multiplexer (pin mux 218), and a pad controller 220. The multiple circuit components 114 can further include a random number generator (RNG 222) and a timer 224. Additionally, the circuit components 114 can include any of the memories, as shown in FIG. 2. Although certain examples of memories and other circuit components 114 are depicted in FIG. 2 or described herein, a given implementation of the security circuitry 112 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 112 may include at least one clock generator to generate the clock signals or may include reset circuitry to reset one or more individual components independently of each other, multiple components jointly, or an entire IC chip. Alternatively, the security circuitry 112 may receive at least one clock signal or a reset signal from a source that is external to the security circuitry 112, which source may or may not be on a separate chip. One or more separate circuit components 114 may operate in respective individual clock domains. For instance, circuit components may be synchronized to a clock that is local to a respective component. Components in different clock domains may operate or communicate asynchronously with respect to one another.

Example implementations of the illustrated circuit components 114 are described below. The processor 106 may be realized as a "main," "central," or "core" processor for the security circuitry 112. The processor 106 may, by way of example only, be implemented with a 32-bit, in-order reduced instruction set computing (RISC) core with a multistage pipeline. With, for example, an RISC-V functionality, the processor may implement an M (machine) and a U (user) mode. Activating a reset pin (not shown) (e.g., through de-assertion of an active-low reset pin) causes the processor 106 to exit reset and begin executing code at its reset vector.

The reset vector may begin in the ROM 202, which validates code in the emulated embedded flash (e-flash) before jumping to it. In other words, the code is expected to have been instantiated into the e-flash before the reset is released. In some cases, resets throughout the security circuitry 112 can be made asynchronous active-low as per a comportability specification to support interoperability among the various circuit components. A reset may be generated by the alert handler 208 as a security countermeasure; by a watchdog timer; and so forth. Reset signals may also be sent to other circuit components, such as one of the memories or one of the other circuit components 114.

Coupled to the processor 106 are a debug module 226 (DM) and an interrupt controller 228 (ItC), either of which may also be made comportable. The debug module 226 provides debug-access to the processor 106. By interfacing with certain pins of the IC, logic in the debug module 226 allows the processor 106 to enter a debug mode and provides an ability to inject code into the device (e.g., by emulating an instruction) or into a memory. The interrupt controller 228 may be disposed proximate to the processor 106. The interrupt controller 228 can accept a vector of interrupt sources from within the security circuitry 112. The interrupt controller 228 can also assign leveling and priority to the interrupts before forwarding them to the processor 106 for handling.

The processor 106 can provide any desired level of performance or include any internal circuit components. For example, the processor 106 can include at least one arithmetic logic unit (ALU) (e.g., including an "additional" ALU to calculate branch targets to remove a cycle of latency on taken conditional branches) and multiple pipeline stages. With multiple pipeline stages, a pipeline can perform register writeback to reduce a cycle of latency from loads and stores and prevent a pipeline stall where a response to a load or store is available the cycle after the request. The processor 106 can implement a single-cycle multiplier or produce an imprecise exception on an error response to a store, which allows the processor to continue executing past the store without waiting for the response. Although not depicted, the processor 106 specifically, or the security circuitry 112 generally, can include an instruction cache to provide single-cycle access times for instructions.

In the illustrated example 200, the components of the security circuitry 112 include or have access to three memory address spaces for instructions and data. The ROM 202 is the target for the processor 106 after release of a reset. The ROM 202 contains hard-coded instructions to perform a subset of platform checking before checking the next stage of code. The next stage of code (e.g., a boot loader stored in e-flash memory) can be the first piece of code that is not hard-coded into the silicon of the device. This next stage of code is, therefore, signature-checked for integrity to increase security. The ROM 202 can execute this signature check by implementing a Rivest-Shamir-Adleman-check (RSA-check) algorithm on the full contents of the boot loader.

The flash memory 206 can be implemented as e-flash memory for code storage. This e-flash can house the boot loader mentioned herein, as well as an operating system and applications that layer on top. The SPI device 212 can be used to bulk-load the e-flash memory. The debug module 226 may also be used for code loading. The SRAM 204 can be operated as a scratch pad SRAM that is available for data storage by the processor 106 (e.g., for stack and heap information). The SRAM 204 can also store code.

The security circuitry 112 can include circuit components 114 that may be subservient execution units that are coupled to the processor 106 via the interconnect 122. Each of these circuit components 114 can follow an interface framework that ensures comportability with each other and with the processor 106. A comportability scheme can specify how the processor 106 communicates with a given circuit component (e.g., using the interconnect 122), how a circuit component communicates with the processor 106 (e.g., using interrupts), how a circuit component communicates security events (e.g., using alert indications) to other circuit components, like the alert handler 208; how a circuit component communicates with peripheral devices (e.g., through a chip I/O); or combinations thereof. The depicted circuit components 114 can comprise circuit components relative to the alert-related functionality provided by the alert handler 208, relative to the processor 106, relative to one or more the memories, relative to a chip I/O, and so forth. Thus, the memories can also comprise circuit components 114 relative to each other or the other depicted circuit components.

Circuit or chip I/O include the pin mux 218 and the pad controller 220. The pin mux 218 provides signaling routes between at least a portion of the circuit components 114 and available multiplexable I/O nodes of the security circuitry 112 (e.g., pins of the chip in which the various components are integrated or an interface to other portions of an SoC). The pad controller 220 manages control or pad attributes like drive strength, technology, pull up versus pull down, and the like of each of the circuits' components. The pin mux 218 and the pad controller 220 may themselves be peripheral devices on the interconnect 122. Accordingly, each may have or may otherwise be associated with at least one collection of registers that provide software configurability.

The UART unit 214 can implement UART features, such as single-lane duplex UART functionality. The outputs and inputs thereof can be configured to connect to any circuit I/O via the pin mux 218. The GPIO interface 216 creates G bits of bidirectional communication to external circuitry via the pin mux 218, where G is a positive integer like 16, 32, or 64. Regarding memory I/O, the SPI device 212 can implement a firmware mode. Here, the firmware mode can enable a feature that provides the ability for external drivers to send firmware upgrade code into a bank of the flash memory 206 for in-field firmware updates. The firmware mode can include addressing of the memories using SPI transactions. Although not depicted, the security circuitry 112 can include an inter-integrated circuit (I2C) host to enable command of I2C devices. This command of I2C devices may include standard, full, and fast modes.

Several "core security" components are also depicted, including the encryption engines and the alert handler 208. The AES unit 116 (e.g., Crypto IP block 116" in FIG. 2), which may be implemented as described with reference to FIG. 1, can provide various symmetric encryption and decryption functionalities, such as by using one or more protocols and/or varying key sizes, like 128$b$, 192$b$, or 256$b$. In aspects, the AES unit 116 may include one or more S-Boxes 118, with registers 120 thereof, in accordance with one or more aspects of efficient and secure data handling using domain-oriented masking. The component can select encryption or decryption of data that arrives in, e.g., 16-byte quantities to be encrypted or decrypted using different block cipher modes of operation. The AES unit 116 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the cryptographic engine via register writes. Alternatively, private channels for the transfer of key and data material may be included to reduce exposure from potentially untrusted processor activity.

The HMAC engine 210 may utilize, for instance, a secure hash algorithm (SHA) SHA-256 as a hashing algorithm. SHA-256 is a member of the SHA-2 family of hashing algorithms in which the digest (or hash output) is of 256$b$ length, regardless of the data size of the input to be hashed. The data is sent into the HMAC engine 210 after declaring the beginning of a hash request. This zeroes out the internal state to initial conditions, e.g., 32$b$ at a time. Once the data has been sent by a component client, the client can indicate the completion of the hash request (with optional partial-word final write). In accordance with an example portability interface scheme, the HMAC engine 210 produces the hash result and makes it available for register read by the requesting client. The data transfer may be made processor-available or may be made private to reduce exposure to potentially untrusted processor activity.

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (via SHA-256) of the message. To provide this functionality, a 256$b$ key may be programmed into the circuit component before the message hash begins. The timing of authentication completion can vary and may be longer in latency than using native SHA-256. Here again, the hashing information or the secret key may be made processor-available for convenience or processing efficiency or may be rendered private in some manner for increased security.

The alert handler 208 is responsible for processing and responding to alerts, including ones provided from other circuit components 114. The alerts can be considered security-sensitive interrupts that are to be handled in a timely manner to respond to a perceived security threat. Unlike "standard" interrupts, alerts may not be handled solely by software executing on the processor 106. Alerts can trigger a first-stage request to be handled by software as a "regular" interrupt. If, however, the software is not able to respond and properly remedy the alert-triggered interrupt, then the alert handler 208 triggers a second-stage response. The second-stage response can include enacting a security countermeasure, including terminating a process, erasing or otherwise deleting data, withdrawing power from a circuit portion, or resetting an IC chip or portion thereof. This ensures that the underlying issue—the perceived security threat—is addressed even if the processor 106 is busy, wedged, or also under attack.

Thus, an alert can be implemented as an elevated interrupt-type signal or alert indication that the alert handler 208 receives from other circuit components and that is indicative of a potential security threat. In operation, the alert handler 208 can gather alerts from other circuit components 114 of the security circuitry 112 and convert them into interrupts that the processor 106 can address. If the processor 106 does not clear the interrupt, however, the alert handler 208 provides hardware responses to address the potential security threat.

The security circuitry 112 can also include the RNG 222. Generally, randomness can contribute to the security functionality by providing variations in execution that can keep attackers from predicting a good time to launch an attack. A random number, for instance, can provide secret material used for identity and cryptographic purposes. The RNG 222 can be seeded into algorithmic computation to obscure sensitive data values. In aspects, the RNG 222 can be utilized in the entropy generation process to provide randomness (or pseudo-randomness) to the AES unit 116 (e.g., for masking). Generally, the RNG 222 provides better performance as its number generation increasingly becomes truly random and to the extent it can also be hardened against attack. In some cryptographic processes, strong randomness guarantees may not be required.

The RNG 222 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting circuit components or software can read from this pool to the extent bits are available. Attempted reading of entropy bits that are not available can trigger an interrupt or an alert.

Two other circuit components 114 include the timer 224 and a flash controller (not shown), the latter of which is described in the following paragraph. The timer 224 can, for example, support accurate performance by the processor 106. The timer 224 is formed from multiple bits (e.g., 64 bits) and operates as a free-running timer with a guaranteed frequency to within some percentage. The timer 224 may enable the circuit components 114 to determine appropriate time intervals to perform operations. For example, the AES unit 116 may perform various operations in accordance with the timer 224 (e.g., along clock cycles). Another timer (not explicitly shown) can act as a watchdog timer to backstop the processor 106 in case the processor becomes unresponsive. The unresponsiveness may be due to development code that is wedged, a security attack, and so forth.

Although not shown, a flash controller may control the flash memory 206, which is available for code and data storage. The primary read path for this data can be in the standard memory address space. Writes to that address space can be ignored, however, because flash is not written to in a standard way. Instead, to write to the flash memory 206, software interacts with the flash controller. The flash functionality can include three primary commands: read, erase, and program. Read commands can be standardized and can use the chip memory address space. Erase commands are performed at a page level, where the page size is parameterizable by the flash controller. Upon receiving an erase request, the flash controller wipes the contents of the target page, which renders the data into a "1" state (e.g., 0xFFFFFFFF per word). Afterward, software can program individual words to any value. A flash bit is not returned to a "1" state without another erase, so future content is effectively changed with an AND of the current content and the written value. Erase and program commands are relatively slow. A typical erase time is measured in milliseconds, and program times are in the range of microseconds. Security is also a concern because secret data may be stored in the flash memory 206. Some memory protection can therefore be provided by the flash controller.

The security circuitry 112 is depicted in FIG. 2 with a particular set of circuit components. A given security circuitry can, however, have more, fewer, or different circuit components. The circuit components may also be interconnected differently or operate in manners besides those example manners described herein. Further, some circuit components may be omitted while other circuit components are implemented in multiple instances. For example, the alert handler 208 may be duplicated or distributed, or multiple AES units 116 may be present in some security circuitry. Further, a GPIO interface 216 may be omitted from among the circuit components 114 of security circuitry 112 for IC chips in which the security circuitry 112 forms but one core among dozens.

In aspects, any of the circuit components 114 may include a cryptographic processor 230 that executes the cryptographic operations of the component. In some implementations, the cryptographic processor 230 is separate from the processor 106. In other implementations, the cryptographic processor 230 is implemented within the processor 106. Further, any of the circuit components 114 may include their own cryptographic processor 230 (or processing core) to perform the specific functions of that component.

Figure 3:
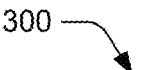
FIG. 3 illustrates an example AES Unit that can implement efficient and secure data handling using domain-oriented masking in accordance with one or more aspects.
Figure 3:
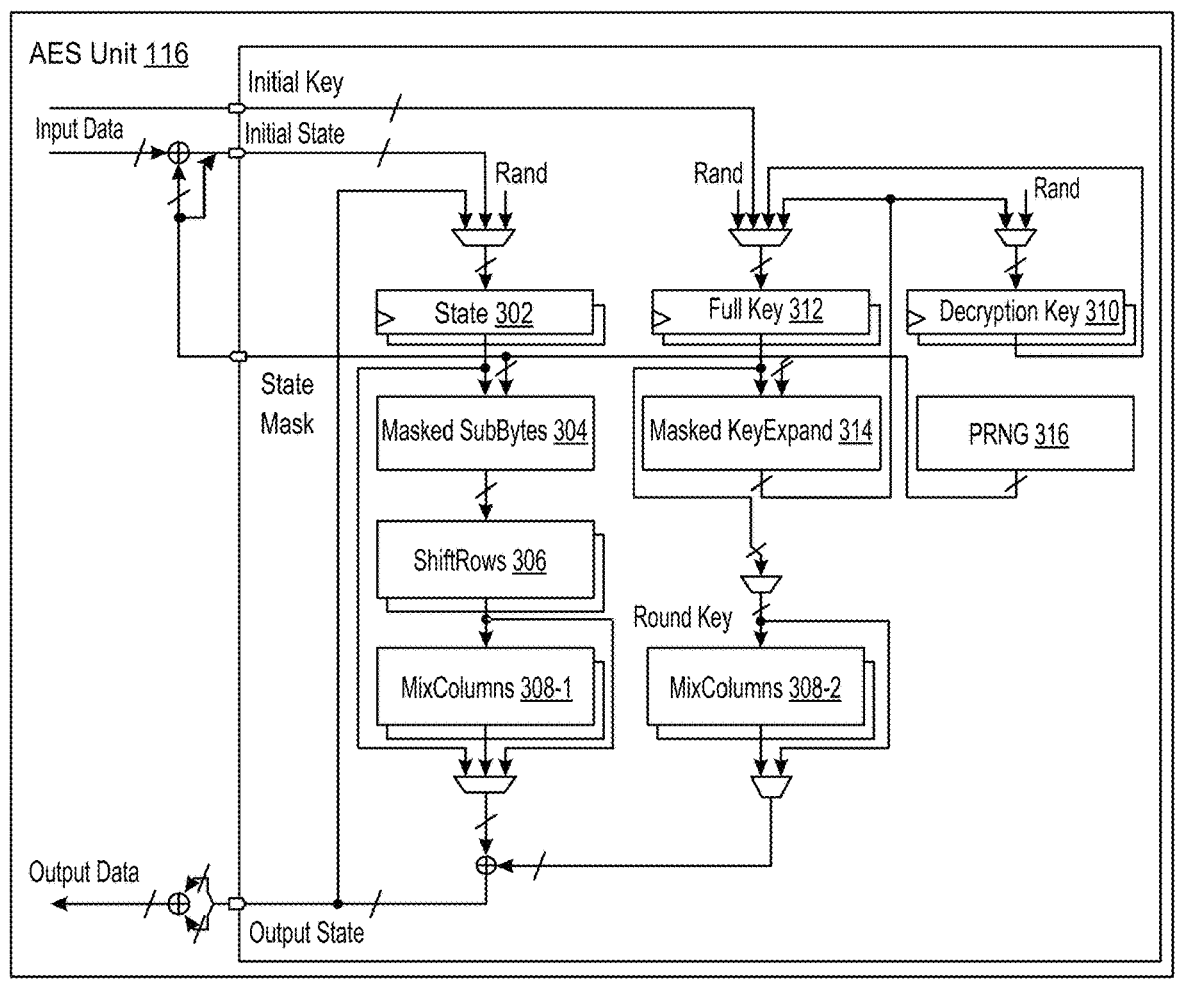

FIG. 3 illustrates an example AES unit 116 that can implement efficient and secure data handling using domain-oriented masking in accordance with one or more aspects. The AES unit 116 can provide symmetric encryption and decryption using one or more protocols and varying key sizes, like 128b, 192b, or 256b. The component can select encryption or decryption of data that arrives in, e.g., 16-byte quantities to be encrypted or decrypted using different block cipher modes of operation.

In aspects, the AES unit 116 includes a PRNG 316 that generates pseudo-randomness to determine a mask. The mask is mixed with the input data using Boolean masking to create the masked data. The masked data may be multiplexed and stored in a state register 302 to be released to the masked SubBytes 304 at an appropriate time.

In implementations, both the masked data and the mask are multiplexed and stored in a state register. Further, when masking is used, the state may include the masked data and the mask. For example, in FIG. 3, this is indicated by blocks (e.g., state, full key, decryption key 310, ShiftRows 306, MixColumns 308) having two boxes each (e.g., one for the masked data and one for the mask). Masked SubBytes 304 and Masked KeyExpand 314 have a single box because they process/mix both masked data and mask together. In additional implementations, there may be multiple masks.

The input data may undergo non-linear operations within the masked SubBytes 304. The masked SubBytes 304 may include any number of S-Boxes or GF multipliers and may implement domain-oriented masking. In aspects, the number of S-Boxes may have a high impact on SCA resistance, circuit area, number of pseudo-random bits consumed per clock cycle and per S-Box evaluation, and throughput. In aspects, the masked SubBytes 304 may include 16 masked S-Boxes. During the SubBytes 304 process, a byte of the input data may be substituted and shifted to produce a cryptographically secure method to reduce the correlation between the input bits and the output bits. Partial results of one or more S-Box evaluations may be forwarded to another S-Box for remasking purposes, as described in greater detail with respect to FIG. 6. At some evaluations, pseudo-randomness may be provided by the PRNG 316 to perform remasking. In general, the SubBytes 304 are implemented such that the circuit operations are resistant to SCA.

While the AES unit 116 is described in terms of a masked implementation, masking may be disabled when it is deemed appropriate, for example, when using the AES unit 116 for random number generations. As such, disabling masking may include unmasked S-Box implementations.

The masked data may then pass through a ShiftRows 306 stage where the rows of the masked data are shifted during the forward process. Within the ShiftRows 306 stage, the rows of the masked data (e.g., state array) may be circularly shifted to scramble the byte order of the input data (e.g., using MUXs). The masked data may then be passed through a MixColumn 308-1 stage where each byte in a column is replaced by a function of all of the bytes in the same column (e.g., using exclusive or (XOR) gates or MUXs). The encryption/decryption may utilize multiple cycles (or stages) of operations.

The AES unit 116 can provide symmetric encryption and decryption using keys and thus, the full key data may be encrypted using the initial key or encrypted using a decryption key 310. The full key may be stored in the full key register 312 to be released to the Masked KeyExpand 314 stage at an appropriate time.

During encryption or decryption, the respective key may be masked and operated on by a number of S-Boxes and GF multipliers at the masked KeyExpand 314 stage. Like the masked SubBytes 304, the masked KeyExpand 314 stage may consist of multiple S-Boxes evaluating in parallel to substitute and shift data in a cryptographically secure manner. In some implementations, the masked KeyExpand 314 stage may perform smaller operations than the masked SubBytes 304 and thus, the masked KeyExpand 314 stage may utilize a fewer number of S-Boxes (e.g., four S-Boxes). In this way, the AES unit 116 may include separate groups of S-Boxes, each having a different number of S-Boxes, to efficiently perform operations of different sizes. The different groups of S-Boxes may be separate from one another or linked together. The S-Boxes utilized by the KeyExpand 314 stage may rely on entropy from the PRNG 316 to perform a first remasking operation at the beginning of each round and forward partial results from previous evaluations of S-Boxes for remasking subsequent operations, as described in greater detail with respect to FIG. 6.

The resulting output of the masked KeyExpand 314 stage may be provided to a MixColumn 308-2 stage where operations similar to those at the MixColumn 308-1 stage are performed. The resulting key may then be mixed with the masked data to create the encrypted or decrypted data. The AES unit 116 may rely on multiple cycles of encryption/decryption and thus, the output may be fed back to the state register 302, and the process may be performed iteratively until all stages of the encryption or decryption process are complete. The AES unit 116 may be designed such that it implements one or more aspects of efficient and secure data handling using domain-oriented masking, which may utilize cryptographically safe circuit optimizations to reduce required area or cost to implement the AES unit 116.

Figure 4:
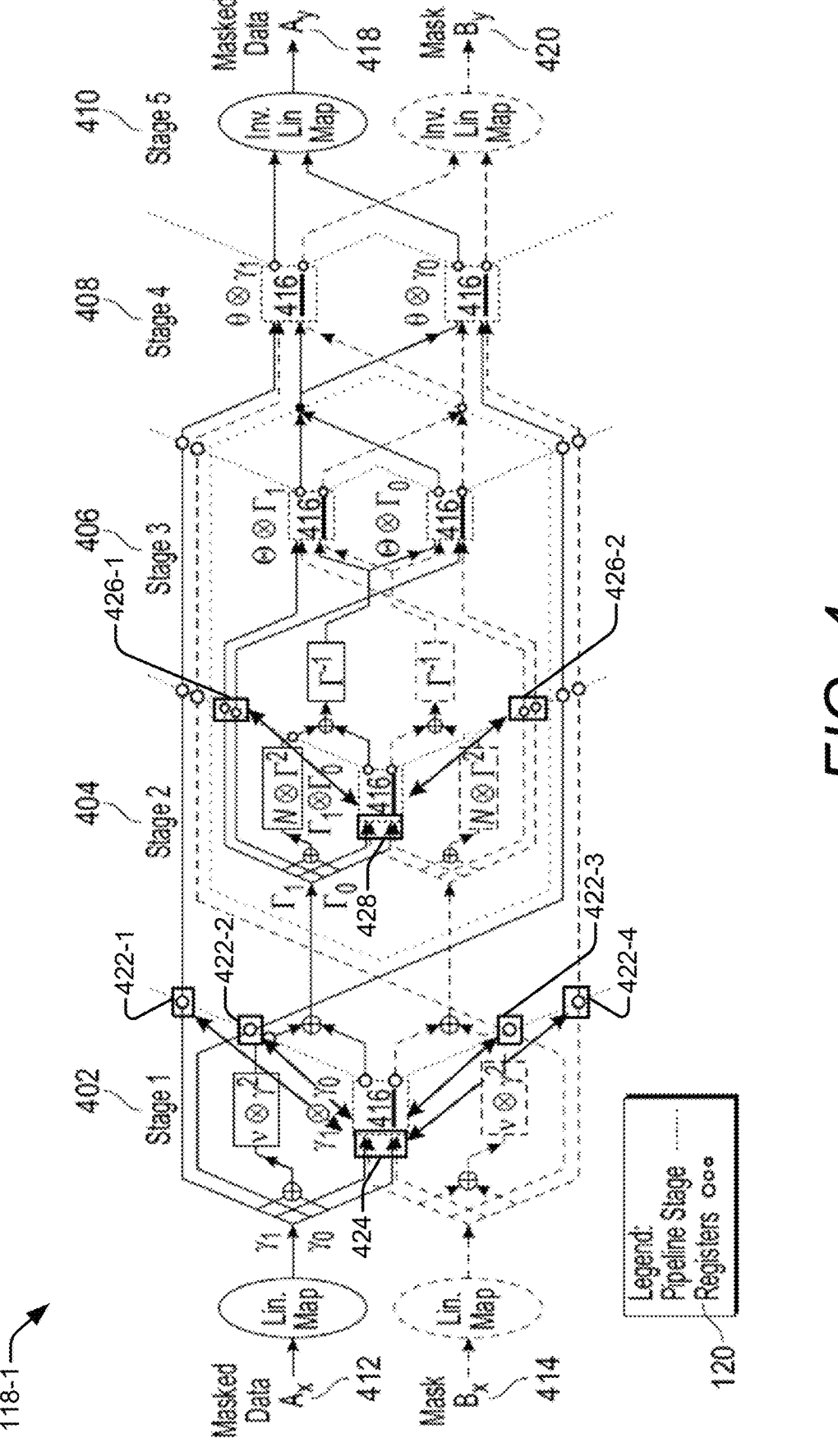
FIG. 4 illustrates an example hardware configuration of an AES Substitution-Box (S-Box) in accordance with one or more aspects of efficient and secure data handling using domain-oriented masking.

FIG. 4 illustrates an example hardware configuration of an S-Box 118-1 in accordance with one or more aspects of efficient and secure data handling using domain-oriented masking. In general, an S-Box is particularly difficult to protect against SCA due to its complexity. As illustrated, the S-Box 118-1 includes five pipeline stages (e.g., stage one 402, stage two 404, stage 3 406, stage four 408, and stage five 410). It should be noted that other S-Box implementations exist which may include more or fewer stages. For example, an S-Box may include eight stages.

At each stage, the masked data 412 (A (wires carrying the masked data represented as solid lines)) and the mask 414 (B (wires carrying the mask represented as dashed lines)) are input to operators (in FIG. 4 the subscript "x" illustrates an input and the subscript "y" indicates an output), for example, the GF multipliers 416.

The GF multipliers 416 are utilized as complex circuits to perform operations on the data input to the multiplier from the input registers. The GF multipliers 416 may utilize domain-oriented masking to protect the S-Box 118-1 against side-channel leakage. Although not shown for simplicity, the GF multipliers 416 may utilize fresh randomness (e.g., pseudo-randomness) to prevent side-channel leakage during evaluation, as discussed in greater detail with respect to FIG. 5.

It should be noted that individual input registers are not shown for clarity, however, the S-Box 118-1 may include input registers (an example of the registers 120) before one or more instances of the GF multiplier 416 to store an input value until the appropriate time to release the value to the GF multiplier 416. The stages may also include pipeline registers (an example of the registers 120) that carry data from one pipeline stage to the next.

The masked data 412 and the mask 414 are linearly mapped through a set of linear operators. In aspects, the masked data 412 and the mask 414 are 8-bit inputs, although other implementations may include larger or smaller inputs. The linear mapped outputs may temporarily include glitches (e.g., due to different wire lengths, gate delays, etc.), as discussed in the overview, which may cause the data to become susceptible to SCA. To mitigate this problem and ensure security by controlling the presence of glitches in the signal, flip flops (not shown) may be placed before the input registers 424 (e.g., at least two input registers) and the pipeline registers 422 (e.g., at least two pipeline registers, pipeline register 422-1, pipeline register 422-2, pipeline register 422-3, and pipeline register 422-4) at stage one 402. The same data may be held in the input registers 424 and the pipeline registers 422. Thus, each pair of input registers 424 and the corresponding pipeline register 422 may be coupled to a shared flip flop, thereby reducing the need for a single flip flop per pair of input registers 424 and pipeline registers 422.

In stage one 402, the masked data 412 and the mask 414 may be operated on by a GF (24) multiplier 416. As such, the input registers 424 may include four input registers, each with a corresponding pipeline register 422 that holds a same value. Thus, by sharing a flip flop for each of these register pairs, four flip flops may be saved without damaging SCA resistance.

Each stage of the S-Box 118-1 may be initiated on a particular clock cycle. In this way, the pipeline registers 422 and output registers (e.g., storing values output from the GF multiplier 416, the scalar operator of stage one 402) may store data until stage two 404 is to begin operation. At the beginning of operation of stage two 404, the data may be released from the output registers and the pipeline registers 422 and provided to stage two operators or stage two pipeline registers. The data from the output registers may be passed to pipeline registers 426 (e.g., pipeline registers 426-1, pipeline registers 426-2) and the input register 428.

In some S-Box designs, each of the input registers 248 and the pipeline registers 426 may be coupled to its own flip flop that removes the transient effects of signals passed to the registers. Given that the input registers 428 (e.g., at least two input registers) and the pipeline registers 426 (e.g., at least two pipeline registers) may store the same values, a single flip flop may be shared by each pair of the pipeline registers 426 and the input registers 428. Specifically, each input register/pipeline register pair of the input registers 428 and pipeline registers 426 may be coupled to a shared flip flop. In some implementations, the input registers 428 may include four registers, and the pipeline registers 426 may include four registers. As such, four flip flops may be eliminated from the S-Box 118-1 in stage two 404. As described above, efficient and secure data handling using domain-oriented masking may reduce the circuit area required to implement stage one 402 and stage two 404 of an S-Box. In aspects, this optimization may reduce the overall circuit area of the S-Box by approximately ten percent.

The output of the stage two operators may be combined and inverted in stage three 406. This data may then be provided, along with the data from the pipeline registers 426-2 to the GF multipliers 416 of stage three 406. The output of this multiplier may then be provided to the GF multipliers 416 in stage four 408 along with the data passed through registers from the pipeline registers 422. In stage five 410 the output of the GF multipliers 416 of stage four 408 may undergo a set of linear operations that implement an inverse linear map. The inverse linear map may then output the masked data output 418 and the mask output 420.

Figure 5:
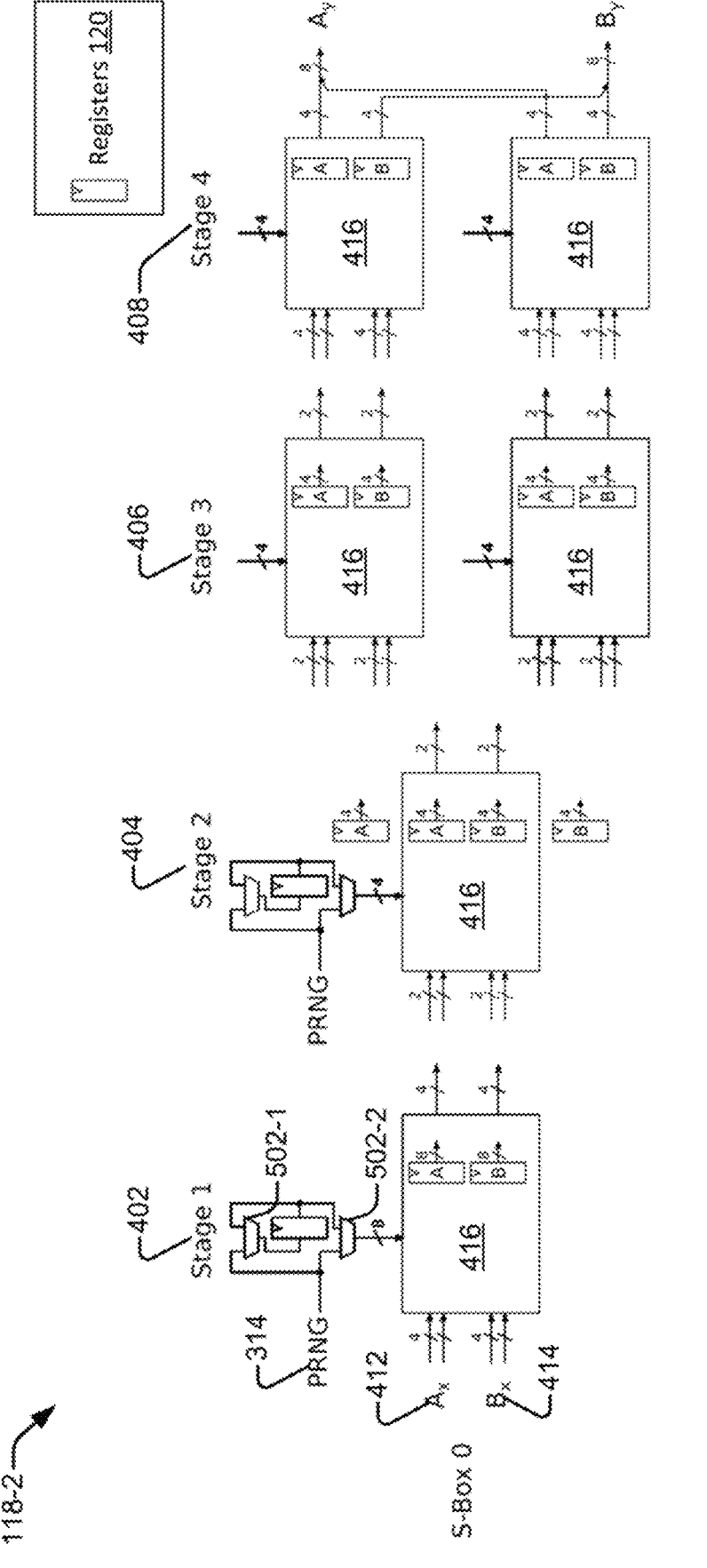
FIG. 5 illustrates an example hardware configuration of an AES S-Box including multiple Galois-field multipliers with entropy injection circuitry.

FIG. 5 illustrates an example hardware configuration of an AES S-Box 118-2 including multiple Galois-Field multipliers with entropy injection circuitry. In aspects, six GF multipliers 416 are illustrated within their respective stages (e.g., stage one 402, stage two 404, stage three 406, stage four 408), as described above with respect to FIG. 4. As discussed above, entropy may be needed to perform remasking operations that prevent side-channel leakage during evaluation of the GF multipliers 416.

Entropy injection circuits may be implemented for each of the GF multipliers 416 to provide fresh randomness and avoid SCA leakage. In aspects, stage one utilizes a GF (24) multiplier 416, which requires eight bits of randomness. To ensure that side-channel leakage does not occur, fresh randomness should only be applied in the same cycle where an input is updated. If fresh randomness is provided without updating the input or the input is updated without applying fresh randomness, side channel leakage may occur.

To ensure fresh randomness is provided only when necessary, the entropy injection circuit forwards the entropy to the GF multiplier 416 when the associated multiplier is evaluated. If fresh randomness is not needed (e.g., the GF multiplier 416 does not evaluate), the PRNG 316 provides the randomness to a register 120 where it is buffered until remasking is needed. Per input bit, this entropy injection may require two MUXs 502 (e.g., MUX 502-1 and MUX 502-2) and register 120 (e.g., including a flip-flop). Throughout the S-Box, fresh randomness is needed at each stage. For example, the second stage requires four bits of fresh randomness and the third and the fourth stage require a total of eight bits per stage (e.g., four bits of fresh randomness for each of the two GF multipliers 416 within each stage). As a result, this implementation may require a large circuit area and complex buffering logic to ensure that GF multipliers 416 are only updated with randomness when the associated inputs are updated.

Figure 6:
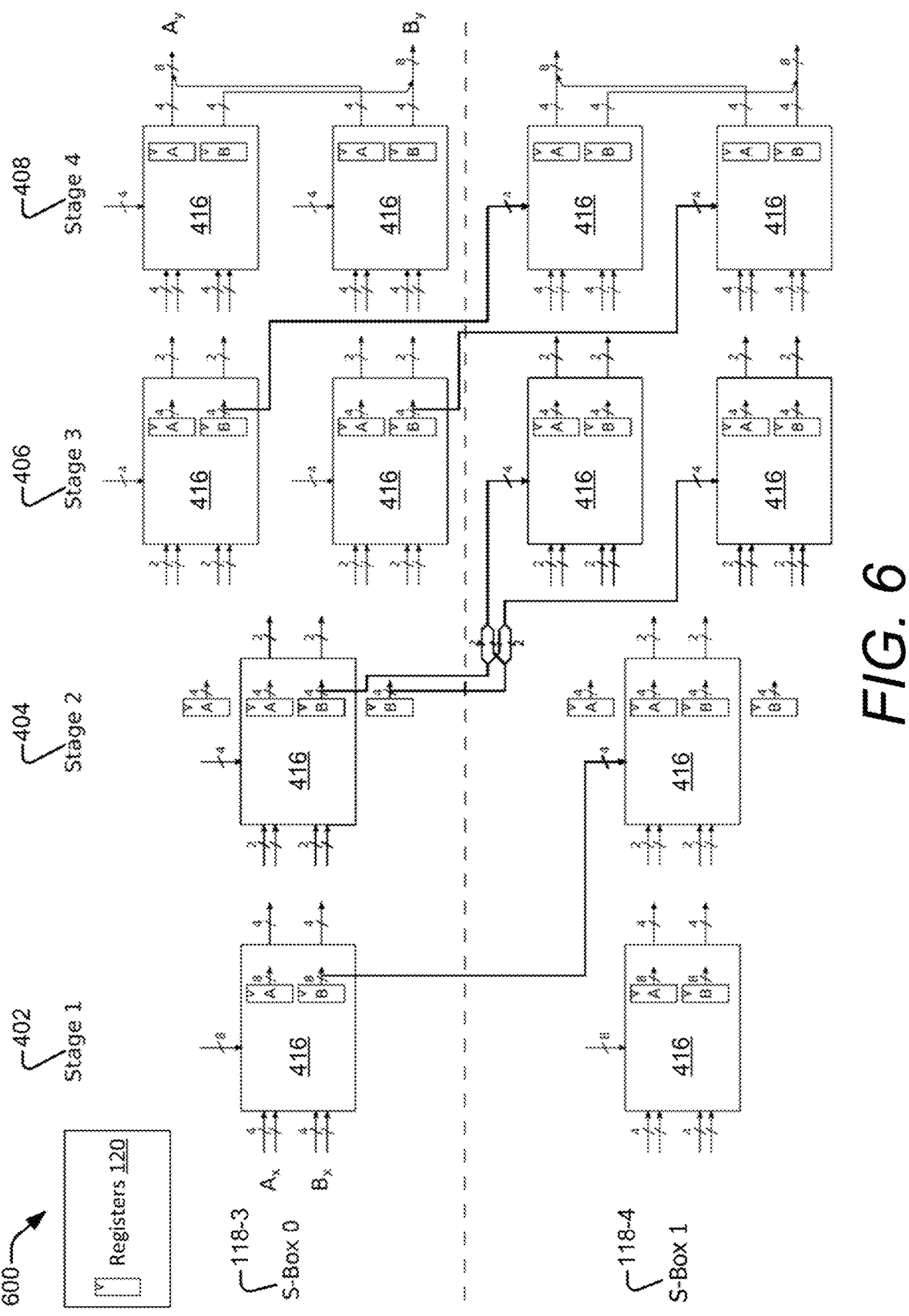
FIG. 6 illustrates an example hardware configuration of multiple AES S-Boxes in accordance with one or more aspects of efficient and secure data handling using domain-oriented masking.

FIG. 6 illustrates an example hardware configuration 600 of multiple AES S-Boxes 118 (e.g. S-Box 118-3 and S-Box 118-4) in accordance with one or more aspects of efficient and secure data handling using domain-oriented masking. In aspects, the S-Boxes 118 may perform similar operations as those described with respect to FIGS. 3-5. The S-Boxes 118 may include five stages (e.g., stage one 402, stage two 404, stage three 406, stage four 408, stage 5 (not shown)). In contrast to the S-Box of FIG. 5, the S-Boxes 118 of FIG. 6 may be coupled to one another such that intermediate results (e.g., the mask or the masked data but not both) from a previous stage of a first S-Box (e.g., S-Box 118-3) may be used as randomness in a subsequent stage of a different S-Box (e.g., S-Box 118-4).

In connecting the GF multipliers 416 across S-Boxes 118, the number of injection randomness circuits needed to inject fresh randomness into the GF multipliers 416 at each stage may be reduced, thereby reducing circuit area. Instead of using individual entropy injection circuits, the intermediate results of a first S-Box may be used as fresh randomness in a second S-Box. The techniques may only require a single entropy generation circuit for each of the S-Boxes 118 to produce entropy for the GF multiplier 416 of stage one 402. For example, after the execution of stage one 402, the output of a first S-Box 118-3 in a previous stage may be used to provide entropy to a second S-Box 118-4 in a subsequent stage. This process may be repeated for any number of S-Boxes where each S-Box provides and/or receives randomness to/from one or more different S-Box.

In some implementations, an S-Box may provide randomness to multiple S-Boxes. For example, the intermediate results of an S-box may provide more bits than is needed as randomness in a subsequent stage. In this way, a portion of the intermediate results may be used as randomness in the subsequent stage of a different S-Box and the subsequent stage of another different S-Box. Alternatively or additionally, randomness may be provided in a subsequent stage by multiple S-Boxes in a previous stage, where a portion of the partial results from each S-Box are combined and used as randomness. For example, randomness may be provided from a first S-Box and a second S-Box to multiple GF multipliers 416 of one or more S-Boxes. In aspects, the multiple GF multipliers 416 receiving entropy may be within a same S-Box or different S-Boxes. The first S-Box and the second S-Box may each contain a GF multiplier that provides an output containing a first and second portion (e.g., a proper subset of bits of the intermediate results).

In one implementation, the first portion of the output (e.g., from the GF multiplier 416 in a previous stage) of the first S-Box may be combined with a first portion of the output (e.g., from the GF multiplier 416 in a previous stage) of the second S-Box and provided as randomness to a single GF multiplier of the multiple GF multipliers 416 (e.g., in a subsequent stage of a different S-Box). As such, a GF multiplier 416 in a subsequent stage may receive randomness from multiple S-Boxes 118, multiple GF multipliers 416, or both.

Similarly, the second portion of the output of the first GF multiplier in the first S-Box may be combined with the second portion of the output of the GF multiplier of the second S-Box and provided to a different GF multiplier of the multiple GF multipliers 416. In this way, a single GF multiplier may provide randomness to multiple GF multipliers, multiple S-Boxes 118, or both.

In general, multiple variations of entropy forwarding may exist that provide/receive entropy to/from a different number of S-Boxes. In some examples, any of these variations may be appropriate, so long as other restrictions are followed, for example, that only partial (e.g., intermediate) results are used (e.g., either the mask or the masked data but not both) and entropy is forwarded to a different S-Box (e.g., not forwarded to a subsequent stage within the same S-Box).

By providing entropy from a previous stage to a subsequent stage, the buffering logic in entropy injection may be removed. For example, when a GF multiplier 416 in stage one 402 of an S-Box 118-3 evaluates, the intermediate output may be maintained in a register 120. This value may then be provided as entropy to a GF multiplier 416 in stage two 404 of a different S-Box 118-4, since the output of the intermediate results in the GF multiplier 416 of stage one 402 indicates the GF multiplier 416 in stage two 404 of the different S-Box 118-4 will be evaluated. In this way, fresh randomness may be provided to a GF multiplier only when the input to the GF multiplier is updated, as may be required to prevent side-channel leakage, without requiring additional buffer logic, thereby ensuring the correctness and stability of applying randomness in accordance with the desired clock cycle. This process can be implemented across each stage, where a previous stage provides the randomness for a subsequent stage, and enable each S-Box in a group of S-Boxes 118 to be daisy-chained together to reduce circuit area.

To ensure the independence of the fresh randomness, the fresh randomness may be taken from a different S-Box than the one to which it is provided. In aspects, this creates independence between the inputs to the GF multiplier and the randomness provided. Partial results from an S-Box may be used as randomness, for example, the masked data or the mask, to ensure the independence of the operations from the true value of the data (e.g., the secret or the sum of the mask and the masked data). In fact, this independence may be proven mathematically. If both the mask and the masked data are used as randomness, however, the randomness provided may represent the secret of the operation, thus causing side-channel leakage.

To further ensure security against SCA, higher-order masking may be performed. In some implementations, first-order masking is used where a single mask is added to the data to create the masked data. However, in some implementations, higher-order masking may be used. In higher-order masking, multiple masks may be added to the data, for example, n masks, to increase security hardening against SCA. In this implementation, additional randomness may be needed to create additional masks, which may or may not be forwarded from previous stages as described above.

In providing randomness, it may be important to ensure the uniformity of the input randomness. That is, to ensure that the randomness provided is not statistically skewed toward a particular value. To create this uniformity, the intermediate results (e.g., the mask or the masked data) may be taken from a different S-box than the one to which they are provided. Like the independence of the randomness, the uniformity may be proven mathematically.

As discussed, any number of S-Boxes may be connected to provide randomness to the respective GF multipliers. In this way, the number of S-Boxes utilized in each implementation acts as a degree of freedom to leverage circuit area, computation time, and SCA resistance. For example, the S-Boxes 118 may be used in an iterative fashion such that fewer S-Boxes may correctly process the data by using more iterations (e.g., more computation time). By iteratively utilizing the same S-Boxes 118, any leakage in the system may become more prevalent to an attacker (e.g., due to repetition or a lower noise floor from operating fewer S-Boxes), thus decreasing SCA resistance. However, the decrease in total S-Boxes 118 may enable the design of a circuit with a smaller circuit area, thereby lowering cost. In a design with a larger number of S-Boxes 118, the system may operate with a greater noise floor due to a contribution from more S-Boxes 118. As a result, effective SCA may become more difficult, thus increasing security.

Due to this tradeoff, multiple sets of connected S-Boxes 118 may be implemented within a design to enable a different number of S-Boxes 118 to be used based on the characteristics of each computation. For example, a circuit may contain a larger set of sixteen connected S-Boxes 118 and a smaller set of four connected S-Boxes 118. In aspects, the smaller set of S-Boxes 118 may be used for smaller or less security-integral computations, and the larger set may be used for larger or more security integral computations. Because the randomness is only updated when a GF multiplier 416 is evaluated, overly large sets of S-Boxes 118 may be suboptimal for some calculations. Thus, having different sized sets of S-Box loops may allow for different computations to be handled optimally.

Methods 700 are illustrated as a set of blocks that specify operations that may be performed but are not necessarily limited to the order or combinations shown for performing the operations by the respective blocks. Further, any of one or more of the operations may be repeated, combined, reorganized, or linked to provide a wide array of additional and/or alternate methods. The techniques are not limited to performance by one entity or multiple entities operating on one device. In some aspects, operations or acts of the method 700 are implemented by or managed by an S-Box, a GF multiplier, or any other component. For clarity, the methods are described with reference to the elements of FIG. 1B and/or entities, components, or configurations described with reference to FIGS. 1-6.

Figure 7:
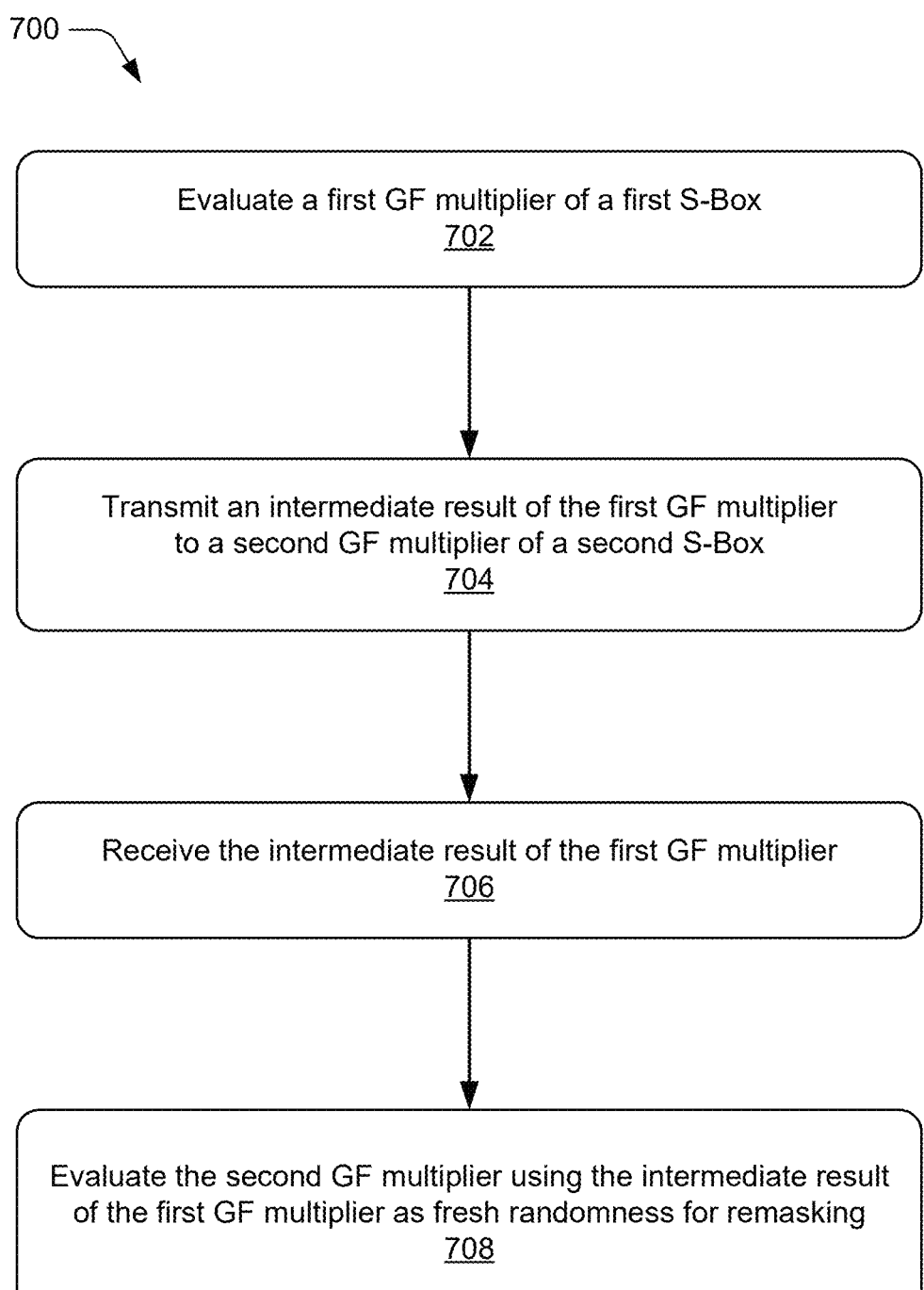
FIG. 7 illustrates an example method for performing a cryptographic operation in accordance with one or more aspects of efficient and secure data handling using domain-oriented masking.

FIG. 7 illustrates an example method 700 for performing a cryptographic operation in accordance with one or more aspects of efficient and secure data handling using domain-oriented masking. The method may reduce the need for entropy generation circuitry and buffer logic and reduce the circuit area required to implement an S-Box 118.

At 702, a first GF multiplier (e.g., GF multiplier 416) of a first S-Box (e.g., S-Box 118) is evaluated. For example, a mask 414 and masked data 412 may be provided to the first GF multiplier 416, where they are operated on when the multiplier is evaluated. If the first GF multiplier is in stage one 402 of the first S-Box, the GF multiplier may be provided entropy from an entropy generation circuit to perform remasking. The first GF multiplier may produce intermediate results (e.g., the mask 414 or the masked data 412 after the operations are performed on them), which may be combined to reveal the secret.

At 704, an intermediate result of the first S-Box is transmitted to a second GF multiplier (e.g., GF multiplier 416) of a second S-Box (e.g., S-Box 118). In aspects, a register 120 holding the intermediate result of the first S-Box may be coupled to the randomness input of the second GF multiplier. The intermediate result of the first S-Box may be transmitted to the second GF multiplier within a subsequent stage of the second S-Box. In aspects, forwarding the intermediate results to a new S-Box after the first GF multiplier, which is in a previous stage, has executed may prevent side-channel leakage.

At 706, the intermediate result of the first GF multiplier is received at the second GF multiplier. For example, the intermediate result may be received in a same clock cycle that the input to the second GF multiplier is updating, thereby reducing the likelihood of side-channel leakage.

At 708, the second GF multiplier may be evaluated using the intermediate result of the first GF multiplier as fresh randomness for remasking. The second GF multiplier may evaluate a mask 414 and masked data 412 provided to the second GF multiplier. In aspects, the intermediate result may be used for remasking after operations are performed on the mask 414 and the masked data 412. By using the intermediate results from a previous stage as randomness in a subsequent stage costly entropy generation circuitry and buffering logic may be removed from the S-Box 118 design.

Figure 8:
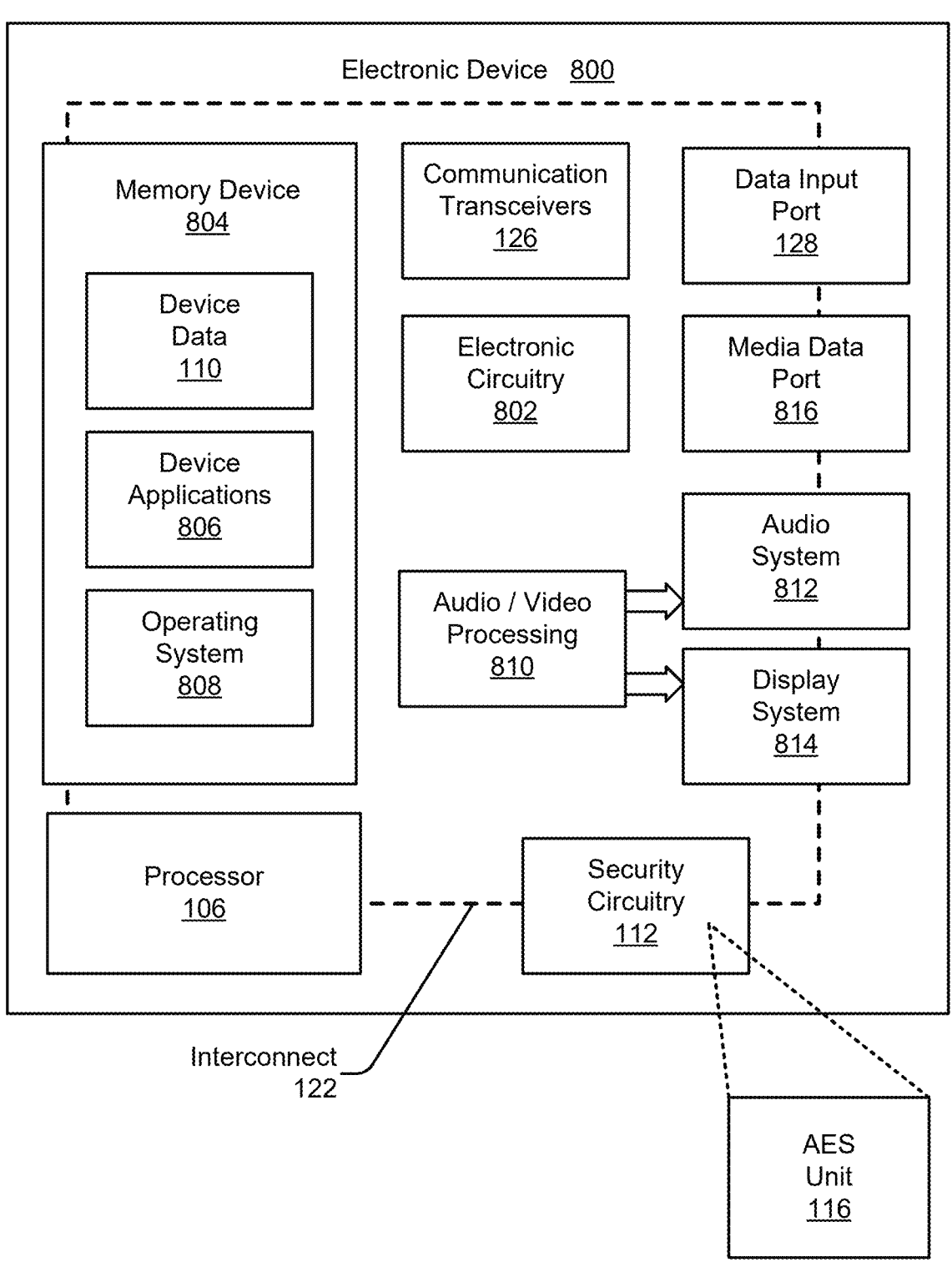
FIG. 8 illustrates an example electronic device that may implement one or more aspects of efficient and secure data handling using domain-oriented masking.

FIG. 8 illustrates various components of an example electronic device 800 that can implement efficient and secure data handling using domain-oriented masking in accordance with one or more aspects. The electronic device 800 may be implemented as any single or multiple of a fixed, mobile, stand-alone, or embedded device; in any form of a consumer, computer, portable, user, server, communication, phone, navigation, gaming, audio, camera, messaging, media playback, and/or other type of electronic device 800, such as the smartphone that is depicted in FIG. 1B as the apparatus 102. One or more of the illustrated components may be realized as discrete components or as integrated components on at least one integrated circuit of the electronic device 800. Generally, the various components of the electronic device 800 are coupled via an interconnect 122 and/or one or more fabrics that support communication between the components in accordance with one or more aspects of efficient and secure data handling using domain-oriented masking.

The electronic device 800 can include one or more communication transceivers 126 that enable wired and/or wireless communication of device data 110, such as received data, transmitted data, or other information identified herein. Example communication transceivers 126 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (WiFi™) standards, wireless wide area network (WAN) (WWAN) radios (e.g., those that are Third Generation Partnership Project compliant (3GPP-compliant)) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The electronic device 800 may also include one or more data input ports (e.g., I/O ports 128) via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports may include USB ports, coaxial cable ports, fiber optic ports for optical fiber interconnects or cabling, and other serial or parallel connectors (including internal connectors) for flash memory, digital video discs (DVDs), compact discs (CDs), and the like. These data input ports may be used to couple the electronic device to components, peripherals, or accessories such as keyboards, microphones, cameras, or other sensors.

The electronic device 800 of this example includes at least one processor 106 (e.g., any one or more of application processors, microprocessors, digital signal processors (DSPs), controllers, and the like), which can include a combined processor and memory system (e.g., implemented as part of an SoC), that processes (e.g., executes) computer-executable instructions to control operation of the device. The processor 106 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital signal processor (DSP), an application-specific integrated circuit (ASIC), a field-programmable gate array (FPGA), a complex programmable logic device (CPLD), and other implementations in silicon and/or other materials.

Alternatively or additionally, the electronic device 800 can be implemented with any one or combination of electronic circuitry, which may include software, hardware, firmware, or fixed logic circuitry that is implemented in connection with processing and control circuits, which are generally indicated at 802 (as electronic circuitry 802). This electronic circuitry 802 can implement executable or hardware-based modules (not shown in FIG. 8), such as through processing/computer-executable instructions stored on computer-readable media, through logic circuitry and/or hardware (e.g., such as an FPGA), and so forth.

In aspects, the electronic device 800 includes an interconnect 122, which may include any one or more of a system bus, interconnect, crossbar, data transfer system, or other switch fabric that couples the various components within the device. A system bus or interconnect can include any one or a combination of different bus structures, such as a memory bus or memory controller, a peripheral bus, parity blocks, error correction code (ECC) blocks, a universal serial bus, and/or a processor or local bus that utilizes any of a variety of bus architectures.

The electronic device 800 also includes one or more memory devices 804 that enable data storage, examples of which include random access memory (RAM), non-volatile memory (e.g., read-only memory (ROM), flash memory, erasable programmable read-only memory (EPROM), electrically erasable programmable read-only memory (EEPROM)), and a disk storage device. Thus, the memory device(s) 804 can be distributed across different logical storage levels of a system as well as at different physical components. The memory device(s) 804 provides data storage mechanisms to store the device data 110, other types of code and/or data, and various device applications 806 (e.g., software applications or programs). For example, an operating system 808 can be maintained as software instructions within the memory device 804 and executed by the processor 106.

In some implementations, the electronic device 800 also includes an audio and/or video processing system 810 that processes audio data and/or passes through the audio and video data to an audio system 812 and/or to a display system 814 (e.g., a video buffer or a screen of a smartphone or camera). The audio system 812 and/or the display system 814 may include any devices that process, display, and/or otherwise render audio, video, display, and/or image data. Display data and audio signals can be communicated to an audio component and/or to a display component via a radio frequency (RF) link, S video link, high-definition multimedia interface (HDMI), composite video link, component video link, digital video interface (DVI), analog audio connection, video bus, or other similar communication link, such as a media data port 816. In some implementations, the audio system 812 and/or the display system 814 are external or separate components of the electronic device 800. Alternatively, the display system 814, for example, can be an integrated component of the example electronic device 800, such as part of an integrated touch interface.

The electronic device 800 of FIG. 8 is an example implementation of the apparatus 102 of FIG. 1, an example implementation of a device that can implement efficient and secure data handling using domain-oriented masking as described with reference to FIG. 1B through FIG. 7. The electronic device 800 can thus include security circuitry 112, which can be a separate IC chip or included as part of another IC chip or device, like the processor 106, the electronic circuitry 802, or the memory device 804. Accordingly, one or more of the illustrated components may be integrated on the same IC chip, like an SoC, or at least on a single printed circuit board (PCB).

The security circuitry 112 may include an AES unit 116 that performs cryptographically safe operations using encryption or decryption. The AES unit 116 may include any number of S-Boxes, or registers thereof, in accordance with one or more aspects of the described secure and efficient data handling using domain-oriented masking. The principles of efficient and secure data handling using domain-oriented masking as described herein can therefore be implemented by, or in conjunction with, the electronic device 800 of FIG. 8.

Although aspects of the described techniques and systems for implementing efficient and secure data handling using domain-oriented masking have been described as being applicable to Advanced Encryption Standard (AES), the described techniques and systems are also applicable to any of a variety of other cryptographic schemes and applications, including secure hash algorithms (SHA) (e.g., SHA-1, SHA-2, SHA-3, Keccak), authenticated encryption and hashing (ASCON), Rivest-Shamir-Adleman (RSA), triple data encryption algorithm (3DES), Twofish, elliptic-curve cryptography (ECC), and others.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for a secure cryptographic processor have been described in language specific to certain features and/or methods, the subject of the appended claims is not necessarily limited to the specific features or methods described. Rather, the specific features and methods are disclosed as example implementations for secure cryptographic processing.

Examples of efficient and secure data handling using domain-oriented masking are provided below.

Example 1

An integrated circuit comprising an Advanced Encryption Standard substitution box comprising: a first stage comprising: a masked Galois-field multiplier; at least two input registers to the masked Galois-field multiplier; at least two pipeline registers from the first stage to a second stage of the advanced encryption standard substitution box; a first flip flop configured to operate on a first pair of registers including a first input register of the at least two input registers to the masked Galois-field multiplier and a first pipeline register of the at least two pipeline registers from the first stage to the second stage; and a second flip flop configured to operate on a second pair of registers including a second input register of the at least two input registers and a second pipeline register of the at least two pipeline registers.

Example 2

The integrated circuit of example 1, wherein: the at least two input registers to the masked Galois-field multiplier comprises four input registers; and/or the at least two pipeline registers from the first stage to the second stage of the advanced encryption standard substitution box com- prises four pipeline registers.

Example 3

The integrated circuit of example 1, wherein the first stage further comprises: a third flip flop configured to operate on a third pair of registers including a third input register of the at least two input registers to the masked Galois-field multiplier and a third pipeline register of the at least two pipeline registers from the first stage to the second stage; and/or a fourth flip flop configured to operate on a fourth pair of registers including a fourth input register of the at least two input registers to the masked Galois-field multiplier and a fourth pipeline register of the at least two pipeline registers from the first stage to the second stage.

Example 4

The integrated circuit of example 1, wherein: the masked Galois-field multiplier is a first masked Galois-field multi- plier; and/or wherein the advanced encryption standard substitution box further comprises: the second stage com- prising: a second masked Galois-field multiplier; and at least two input registers to the second masked Galois-field mul- tiplier. The second stage may further comprise; at least two pipeline registers from the second stage to a third stage of the advanced encryption standard substitution box; a third flip flop configured to operate on a third pair of registers including a third input register of the at least two input registers to the second masked Galois-field multiplier and a third pipeline register of the at least two pipeline registers from the second stage to the third stage; and a fourth flip flop configured to operate on a fourth pair of registers including a fourth input register of the at least two input registers to the second masked Galois-field multiplier and a fourth pipeline register of the at least two pipeline registers from the second stage to the third stage.

Example 5

The integrated circuit of example 4, wherein: the at least two input registers to the second masked Galois-field mul- tiplier comprises four input registers; and/or the at least two pipeline registers from the second stage to the third stage of the advanced encryption standard substitution box com- prises four pipeline registers.

Example 6

The integrated circuit of example 4, wherein the advanced encryption standard substitution box further comprises: the second stage comprising: a fifth flip flop configured to operate on a fifth pair of registers including a fifth input register of the at least two input registers to the second masked Galois-field multiplier and a fifth pipeline register of the at least two pipeline registers from the second stage to the third stage; and/or an sixth flip flop configured to operate on an sixth pair of registers including an sixth input register of the at least two input registers to the second masked Galois-field multiplier and an sixth pipeline register of the at least two pipeline registers from the second stage to the third stage.

Example 7

The integrated circuit of example 1, wherein the first pair of registers and the second pair of registers store a mask or masked data.

Example 8

The integrated circuit of example 1, wherein circuit synthesis tools are disabled for at least a portion of the advance encryption standard substitution box.

Example 9

An integrated circuit comprising: at least two Advanced Encryption Standard substitution boxes, a first advanced encryption standard substitution box of the at least two advanced encryption standard substitution boxes compris- ing: a previous stage including a first Galois-field multiplier, an output of the first Galois-field multiplier coupled to a randomness input of a second Galois-field multiplier within a subsequent stage of an additional advanced encryption standard substitution box (e.g., different than/to the first advanced encryption standard substitution box) of the at least two advanced encryption standard substitution boxes.

Example 10

The integrated circuit of example 9, wherein the output of the first Galois-field multiplier is further coupled to: a randomness input of a third Galois-field multiplier within the subsequent stage of the additional advanced encryption standard substitution box; or a randomness input of a fourth Galois-field multiplier within the subsequent stage of a different advanced encryption standard substitution box of the at least two advanced encryption standard substitution boxes, the different advanced encryption standard substitu- tion box different from the additional advanced encryption standard substitution box.

Example 11

The integrated circuit of example 10, wherein: a first portion of the output of the first Galois-field multiplier is coupled to the randomness input of the second Galois-field multiplier, the first portion of the output having a fewer number of bits than the output; and/or a second portion of the output of the first Galois-field multiplier is coupled to the randomness input of the third Galois-field multiplier, the second portion of the output having a fewer number of bits than the output.

Example 12

The integrated circuit of example 11, wherein: the output of the first Galois-field multiplier is a first output; the previous stage of the first advanced encryption standard substitution box further includes a fifth Galois-field multi- plier having a second output; a third portion of the second output of the fifth Galois-field multiplier is coupled to the randomness input of the second Galois-field multiplier, the third portion of the second output having a fewer number of bits than the second output; and/or a fourth portion of the second output of the fifth Galois-field multiplier is coupled to the randomness input of the third Galois-field multiplier, the fourth portion of the second output having a fewer number of bits than the second output.

Example 13

The integrated circuit of example 9, wherein the output from the first Galois-field multiplier comprises partial results of the first Galois-field multiplier, the partial results including at least part of a mask or masked data.

Example 14

The integrated circuit of example 9, wherein: the at least two advanced encryption standard substitution boxes are a first set of advanced encryption standard substitution boxes; and the integrated circuit further comprises: a second set of advanced encryption standard substitution boxes comprising at least two different advanced encryption standard substitution boxes, a second advanced encryption standard substitution box of the at least two different advanced encryption standard substitution boxes comprising: a previous stage including a sixth masked Galois-field multiplier, an output of the sixth Galois-field multiplier coupled to a randomness input of a seventh Galois-field multiplier within a subsequent stage of an additional advanced encryption standard substitution box of the at least two different advanced encryption standard substitution boxes.

Example 15

The integrated circuit of example 14, wherein the first set of advanced encryption standard substitution boxes and the second set of advanced encryption standard substitution boxes comprise a different number of advanced encryption standard substitution boxes.

Example 16

A method of performing secure cryptographic operations using the integrated circuit of any one of examples 1-15. For example, the method may comprise evaluating a first GF multiplier (e.g., GF multiplier 416) of a first S-Box (e.g., S-Box 118); transmitting an intermediate result of the first S-Box to a second GF multiplier (e.g., GF multiplier 416) of a second S-Box (e.g., S-Box 118); receiving the intermediate result of the first GF multiplier at the second GF multiplier; and evaluating the second GF multiplier using the intermediate result of the first GF multiplier as fresh randomness for remasking. As another example, the method may comprise: operating, by a first flip flop, on a first pair of registers including a first input register of at least two input registers to a masked Galois-field multiplier included in a first stage of an Advanced Encryption Standard substitution box and a first pipeline register of at least two pipeline registers from the first stage to a second stage of the advanced encryption standard substitution box, and operating by a second flip flop on a second pair of registers including a second input register of the at least two input registers and a second pipeline register of the at least two pipeline registers. Each flip-flop may, for example, operate on the respective input register and pipeline register to control the occurrence of glitches (transient voltage changes) within a signal.

Although aspects of the described apparatuses, systems, and methods for implementing efficient and secure data handling using domain-oriented masking have been described in language specific to features and/or methods, the subject of the appended claims is, as recited by any of the previous examples not necessarily limited to the specific features or methods described. Rather, the specific features and methods are disclosed as example implementations of efficient and secure data handling using domain-oriented masking, and other equivalent features and methods are intended to be within the scope of the appended claims. Further, various aspects of efficient and secure data handling using domain-oriented masking are described, and it is to be appreciated that each described aspect can be implemented independently or in connection with one or more other described aspects.

What is claimed is:

1. An integrated circuit comprising an advanced encryption standard substitution box comprising:

a first stage comprising:

a masked Galois-field multiplier;

at least two input registers to the masked Galois-field multiplier;

at least two pipeline registers from the first stage to a second stage of the advanced encryption standard substitution box;

a first flip flop configured to operate on a first pair of registers including a first input register of the at least two input registers to the masked Galois-field multiplier and a first pipeline register of the at least two pipeline registers from the first stage to the second stage; and a second flip flop configured to operate on a second pair of registers including a second input register of the at least two input registers and a second pipeline register of the at least two pipeline registers.

2. The integrated circuit of claim 1, wherein:

the at least two input registers to the masked Galois-field multiplier comprise four input registers; and the at least two pipeline registers from the first stage to the second stage of the advanced encryption standard substitution box comprise four pipeline registers.

3. The integrated circuit of claim 2, wherein the first stage further comprises:

a third flip flop configured to operate on a third pair of registers including a third input register of the at least two input registers to the masked Galois-field multiplier and a third pipeline register of the at least two pipeline registers from the first stage to the second stage; and a fourth flip flop configured to operate on a fourth pair of registers including a fourth input register of the at least two input registers to the masked Galois-field multiplier and a fourth pipeline register of the at least two pipeline registers from the first stage to the second stage.

4. The integrated circuit of claim 1, wherein:

the masked Galois-field multiplier is a first masked Galois-field multiplier; and the second stage of the advanced encryption standard substitution box comprises:

a second masked Galois-field multiplier;

at least two input registers to the second masked Galois-field multiplier;

at least two pipeline registers from the second stage to a third stage of the advanced encryption standard substitution box;

a third flip flop configured to operate on a third pair of registers including a third input register of the at least two input registers to the second masked Galois-field multiplier and a third pipeline register of the at least two pipeline registers from the second stage to the third stage; and a fourth flip flop configured to operate on a fourth pair of registers including a fourth input register of the at least two input registers to the second masked Galois-field multiplier and a fourth pipeline register of the at least two pipeline registers from the second stage to the third stage.

5. The integrated circuit of claim 4, wherein:

the at least two input registers to the second masked Galois-field multiplier comprise four input registers; and the at least two pipeline registers from the second stage to the third stage of the advanced encryption standard substitution box comprise four pipeline registers.

6. The integrated circuit of claim 4, wherein the second stage of the advanced encryption standard substitution box further comprises:

a fifth flip flop configured to operate on a fifth pair of registers including a fifth input register of the at least two input registers to the second masked Galois-field multiplier and a fifth pipeline register of the at least two pipeline registers from the second stage to the third stage; and an sixth flip flop configured to operate on an sixth pair of registers including an sixth input register of the at least two input registers to the second masked Galois-field multiplier and an sixth pipeline register of the at least two pipeline registers from the second stage to the third stage.

7. The integrated circuit of claim 1, wherein the first pair of registers and the second pair of registers store a mask or masked data.

8. The integrated circuit of claim 1, wherein circuit synthesis tools are disabled for at least a portion of the advance encryption standard substitution box.

9. An integrated circuit comprising:

at least two advanced encryption standard substitution boxes, a first advanced encryption standard substitution box comprising:

a stage including a first Galois-field multiplier, an output of the first Galois-field multiplier coupled to a randomness input of a second Galois-field multiplier within a subsequent stage of an additional advanced encryption standard substitution box of the at least two advanced encryption standard substitution boxes.

10. The integrated circuit of claim 9, wherein the output of the first Galois-field multiplier is further coupled to:

a randomness input of a third Galois-field multiplier within the subsequent stage of the additional advanced encryption standard substitution box; or a randomness input of a fourth Galois-field multiplier within the subsequent stage of a different advanced encryption standard substitution box of the at least two advanced encryption standard substitution boxes, the different advanced encryption standard substitution box different from the additional advanced encryption standard substitution box.

11. The integrated circuit of claim 10, wherein:

a first portion of the output of the first Galois-field multiplier is coupled to the randomness input of the second Galois-field multiplier, the first portion of the output having a fewer number of bits than the output; and a second portion of the output of the first Galois-field multiplier is coupled to the randomness input of the third Galois-field multiplier, the second portion of the output having a fewer number of bits than the output.

12. The integrated circuit of claim 11, wherein:

the output of the first Galois-field multiplier is a first output;

the stage of the first advanced encryption standard substitution box further includes a fifth Galois-field multiplier having a second output;

a third portion of the second output of the fifth Galois-field multiplier is coupled to the randomness input of the second Galois-field multiplier, the third portion of the second output having a fewer number of bits than the second output; and a fourth portion of the second output of the fifth Galois-field multiplier is coupled to the randomness input of the third Galois-field multiplier, the fourth portion of the second output having a fewer number of bits than the second output.

13. The integrated circuit of claim 9, wherein the output from the first Galois-field multiplier comprises partial results of the first Galois-field multiplier, the partial results including a mask or masked data.

14. The integrated circuit of claim 9, wherein:

the at least two advanced encryption standard substitution boxes are a first set of advanced encryption standard substitution boxes, the stage being a first stage of the first advanced encryption standard substitution boxes; and the integrated circuit further comprises:

a second set of advanced encryption standard substitution boxes comprising at least two different advanced encryption standard substitution boxes, a second advanced encryption standard substitution box of the at least two different advanced encryption standard substitution boxes comprising:

a second stage including a sixth masked Galois-field multiplier, an output of the sixth Galois-field multiplier coupled to a randomness input of a seventh Galois-field multiplier within a subsequent stage of an additional advanced encryption standard substitution box of the at least two different advanced encryption standard substitution boxes.

15. The integrated circuit of claim 14, wherein the first set of advanced encryption standard substitution boxes and the second set of advanced encryption standard substitution boxes comprise a different number of advanced encryption standard substitution boxes.

16. A method for performing secure cryptographic operations, comprising:

evaluating a first Galois-field multiplier of a first advanced encryption standard substitution box of an integrated circuit;

transmitting an intermediate result of the first Galois-field multiplier of the first advanced encryption standard substitution box to a second Galois-field multiplier of a second advanced encryption standard substitution box of an integrated circuit;

receiving, at an input of the second Galois-field multiplier of the second advanced encryption standard substitution box, the intermediate result of the first Galois-field multiplier of the first advanced encryption standard substitution box; and evaluating the second Galois-field multiplier of the second advanced encryption standard substitution box using the intermediate result of the first Galois-field multiplier of the first advanced encryption standard substitution box as randomness for re-masking operations performed by the second Galois-field multiplier of the second advanced encryption standard substitution box.

17. The method of claim 16, further comprising providing a mask and masked data to the first Galois-field multiplier of the first advanced encryption standard substitution box, and wherein the mask and the masked data are operated on when the first Galois-field multiplier is evaluated.

18. The method of claim 17, wherein the intermediate result of the first Galois-field multiplier of the first advanced encryption standard substitution box is transmitted to a randomness input of the second Galois-field multiplier of the second advanced encryption standard substitution box.

19. The method of claim 17, further comprising combining, after the operation on the mask and the masked data, the intermediate results to reveal a secret of data stored by the integrated circuit.

20. The method of claim 16, wherein the second Galois-field multiplier of the second advanced encryption standard substitution box receives the intermediate result of the first Galois-field multiplier of the first advanced encryption standard substitution box during a clock cycle in which the input of the second Galois-field multiplier updates.

* * * * *